United States Patent
Payne et al.

(10) Patent No.: US 9,907,221 B2
(45) Date of Patent: Mar. 6, 2018

(54) HITCH MODULE

(71) Applicant: DEERE & COMPANY, Moline, IL (US)

(72) Inventors: David A. Payne, Urbandale, IA (US); Mark D. Beeck, Ankeny, IA (US); Jarrod Ruckle, Bondurant, IA (US)

(73) Assignee: DEERE & COMPANY, Moline, IL (US)

( * ) Notice: Subject to any disclaimer, the term of this patent is extended or adjusted under 35 U.S.C. 154(b) by 83 days.

(21) Appl. No.: 14/870,630

(22) Filed: Sep. 30, 2015

(65) Prior Publication Data
US 2017/0086346 A1    Mar. 30, 2017

(51) Int. Cl.
*A01B 59/00* (2006.01)
*B60D 1/02* (2006.01)
*A01B 59/042* (2006.01)
*B60D 1/00* (2006.01)

(52) U.S. Cl.
CPC .......... *A01B 59/004* (2013.01); *A01B 59/042* (2013.01); *B60D 1/025* (2013.01); *B60D 2001/008* (2013.01)

(58) Field of Classification Search
CPC ... A01B 59/002; A01B 59/004; A01B 59/006; A01B 59/042; A01B 59/063; B60D 1/00–1/665; B60D 2001/001–2001/548
USPC ................. 280/479.2, 479.3, 478.1
See application file for complete search history.

(56) References Cited

U.S. PATENT DOCUMENTS

| | | | | | |
|---|---|---|---|---|---|
| 3,093,395 | A | * | 6/1963 | Boutwell | B60D 1/40 280/479.2 |
| 3,126,210 | A | * | 3/1964 | Hill | B60D 1/40 280/479.2 |
| 3,410,577 | A | * | 11/1968 | Luinstra | B60D 1/40 280/479.2 |
| 3,795,415 | A | * | 3/1974 | Koch | A01B 63/145 172/439 |
| 3,912,119 | A | * | 10/1975 | Hill | B60D 1/40 280/479.2 |
| 4,114,921 | A | * | 9/1978 | Thorell | B60D 1/40 280/479.3 |
| 4,515,387 | A | * | 5/1985 | Schuck | B60D 1/34 267/138 |
| 4,603,878 | A | * | 8/1986 | Smith, Jr. | B60D 1/44 267/138 |

(Continued)

*Primary Examiner* — Robert E Pezzuto
*Assistant Examiner* — Adam J Behrens
(74) *Attorney, Agent, or Firm* — Taft Stettinius & Hollister LLP; Stephen F. Rost

(57) ABSTRACT

A hitch module adapted to be coupled to a frame of a work machine or towed assembly. The hitch module includes a carrier assembly having a first plate and a second plate coupled to one another. The first and second plates are spaced from one another by a first distance, where both plates define a pivot axis. A guide assembly defines a longitudinal axis and is pivotally coupled to the carrier assembly about the pivot axis. The guide assembly has a first guide plate and a second guide plate coupled to and spaced by a second distance from one another. A hitch assembly is disposed at least partially between the first and second plate of the carrier assembly and the first and the second guide plate. The hitch link assembly is pivotal about the pivot axis and movable along the longitudinal axis.

25 Claims, 17 Drawing Sheets

(56) References Cited

U.S. PATENT DOCUMENTS

| | | | | |
|---|---|---|---|---|
| 4,951,957 A * | 8/1990 | Gullickson | | B60D 1/40 280/479.2 |
| 5,322,315 A * | 6/1994 | Carsten | | B60D 1/40 280/479.2 |
| 5,342,076 A * | 8/1994 | Swindall | | B60D 1/40 280/479.2 |
| 5,580,088 A * | 12/1996 | Griffith | | B60D 1/40 280/478.1 |
| 5,630,606 A * | 5/1997 | Ryan | | B60D 1/40 280/479.3 |
| 5,727,805 A * | 3/1998 | La Roque | | B60D 1/155 280/478.1 |
| 6,502,845 B1 * | 1/2003 | Van Vleet | | B60D 1/44 280/491.1 |
| 7,293,791 B1 * | 11/2007 | Williams, Jr. | | B60D 1/00 280/478.1 |
| 7,425,014 B1 * | 9/2008 | Palmer | | B60D 1/06 280/477 |
| 7,556,279 B2 | 7/2009 | Suhling | | |
| 7,850,190 B2 | 12/2010 | Ruckle et al. | | |
| 7,909,349 B2 * | 3/2011 | Rasset | | B60D 1/02 280/462 |
| 7,909,350 B1 * | 3/2011 | Landry | | B60D 1/06 280/416.1 |
| 8,302,987 B2 * | 11/2012 | Williams, Jr. | | B60D 1/04 280/478.1 |
| 8,789,842 B2 * | 7/2014 | Williams, Jr. | | B60D 1/04 280/406.1 |
| 2007/0080516 A1 * | 4/2007 | Simmons | | B60D 1/40 280/491.3 |
| 2009/0058042 A1 * | 3/2009 | Tveito | | B60D 1/02 280/444 |
| 2009/0315298 A1 * | 12/2009 | Rasset | | B60D 1/02 280/507 |
| 2012/0119469 A1 * | 5/2012 | McConnell | | B60D 1/54 280/478.1 |
| 2013/0154235 A1 | 6/2013 | Boittin et al. | | |
| 2014/0125034 A1 * | 5/2014 | Williams, Jr. | | B60D 1/246 280/478.1 |

* cited by examiner

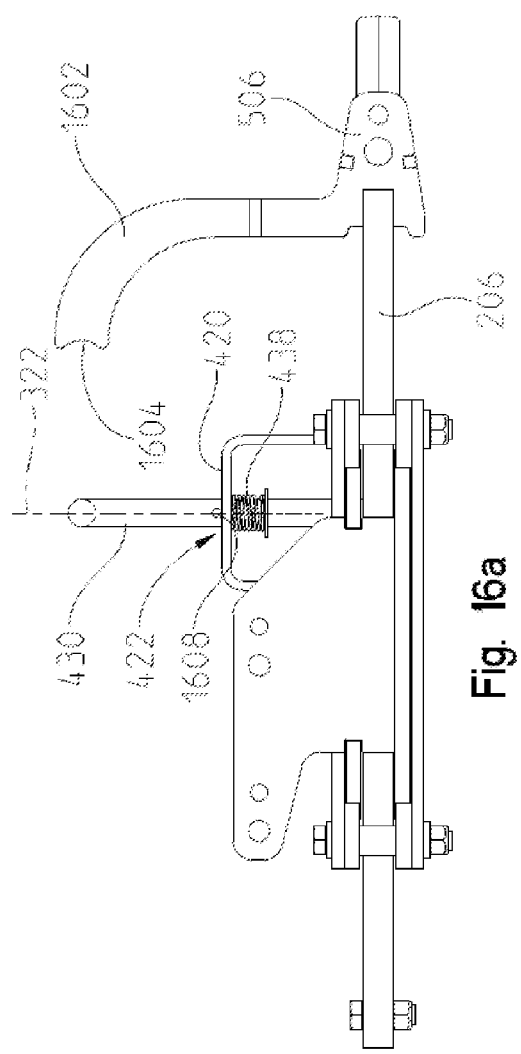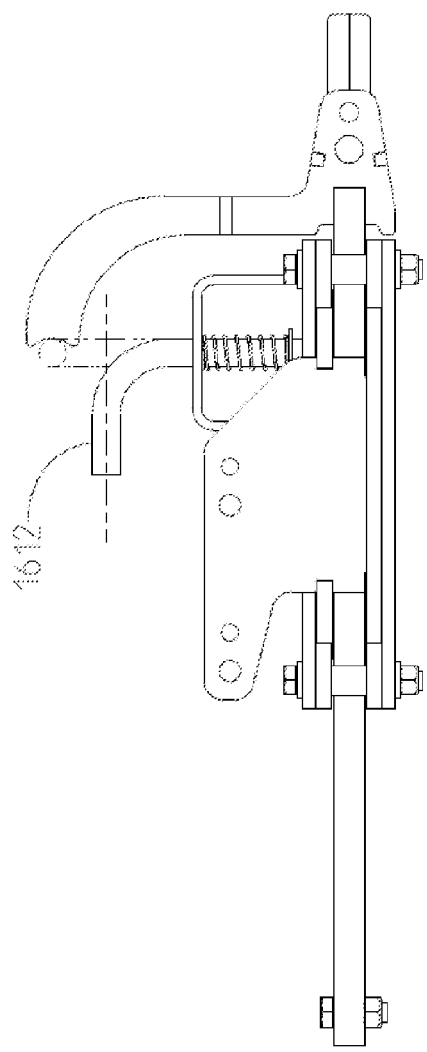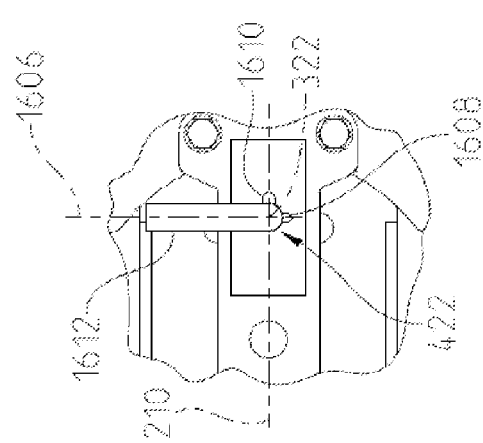

HITCH MODULE

FIELD OF THE DISCLOSURE

The present disclosure relates to a hitch module, and in particular, to a hitch module that can be adjusted to a plurality of orientations.

BACKGROUND OF THE DISCLOSURE

Work machines or towed assemblies often have rear hitch modules that provide a coupling location for a plurality of different towed devices. In addition to providing one or more coupling points, the hitch module is coupled to a frame to be sufficiently strong to pull the towed devices under different load conditions. In order to accommodate heavy load conditions, the hitch module is typically fixedly mounted to the frame, i.e., the hitch module does not move substantially relative to the frame. In this configuration, the hitch module must be correctly aligned with the towed device in order to properly couple the hitch module thereto.

Properly aligning the hitch module with the towed device can be difficult because of the weight/positioning of the towed device and because of the location of the hitch module on the work machine or towed assembly.

SUMMARY

In one embodiment of the present disclosure, a hitch module is adapted to couple to a frame of a work machine or towed assembly. The hitch module includes a carrier assembly including a first plate and a second plate coupled to one another, the first and second plates spaced from one another by a first distance, where both plates define a pivot axis; a guide assembly defining a longitudinal axis and being pivotally coupled to the carrier assembly about the pivot axis, the guide assembly having a first guide plate and a second guide plate coupled to and spaced by a second distance from one another, where the second distance is greater than the first distance; and a hitch assembly disposed at least partially between the first and second plate of the carrier assembly and the first and the second guide plate, the hitch link assembly being pivotal about the pivot axis relative to the carrier assembly and movable along the longitudinal axis relative to the guide assembly.

In one example of this embodiment, the hitch assembly is movable along the longitudinal axis relative to the guide assembly between a first position and a second position; and the guide assembly is pivotable about the pivot axis in a first direction by a first angle relative to the longitudinal axis and a second direction by a second angle relative thereto. In a second example, the hitch assembly includes a hitch link that is movable to a plurality of positions relative to the guide assembly and carrier assembly, the plurality of positions defined within a trapezoidal-shaped area having at least four points, wherein a first point is at the first position and the first angle, a second point is at the first position and the second angle, a third point is at the second position and the first angle, and a fourth point is at the second position and the second angle.

In a third example, a first through-hole is axially aligned through the first guide plate, the first through-hole being spaced a first radial distance from the pivot axis; an arc-shaped through-hole is defined in the first plate, the arc-shaped through-hole defined at the first radial distance from the pivot axis; a second through-hole is defined in the hitch assembly; a third through-hole is defined in the second plate and at the first radial distance from the pivot axis; and a fourth through-hole is defined in the second guide plate and axially aligned with the first through-hole, the fourth through-hole is defined at the first radial distance from the pivot axis; wherein, the first through-hole, the arc-shaped through-hole, and the second through-hole are aligned with one another when the hitch assembly is in the first position; further wherein, the first through-hole misaligned from the second through-hole when the hitch assembly is in the second position.

In a fourth example of this embodiment, the first through-hole, the arc-shaped through-hole, the second through hole, the third through hole and the fourth through-hole are aligned with one another when the hitch assembly is in the first position and the guide assembly is axially aligned with the longitudinal axis. In a fifth example, a pin is axially aligned with the first through-hole and configured to move axially along a central axis defined by the first through-hole, the pin being positionable in at least a first axial position, a second axial position, and a third axial position, wherein in the first axial position, the hitch assembly is not in the first position and the pin is disposed through a portion of the first through-hole and the arc-shaped through-hole; in the second axial position the hitch assembly is in the first position, the guide assembly is not axially aligned with the longitudinal axis, and the pin is disposed through the first through-hole, the arc-shaped through-hole, and the second through-hole; and in the third axial position, the hitch assembly is in the first position, the guide assembly is aligned with the longitudinal axis, and the pin is disposed through the first through hole, the arc-shaped through-hole, the second through-hole, the third through-hole and the fourth through-hole.

In a sixth example of this embodiment, a U-shaped frame member is coupled to the first guide plate, the U-shaped frame defining a pin through-hole; and a spring is disposed between the U-shaped frame member and the first guide plate; wherein, the pin is disposed through the pin through-hole in the first, second, and third axial position; further wherein, the spring biases the pin towards the second guide plate. In a seventh example, the pin includes at least a first stop and a second stop, the first stop limiting axial movement of the pin as it contacts the U-shaped frame member, and the second stop limiting axial movement of the pin as it contacts the first guide plate. In an eighth example, when the pin is in the second axial position, the hitch assembly is substantially restricted from moving out of the first position, and the hitch assembly and the guide assembly can pivot relative to the carrier member. In a ninth example, when the pin is in the third axial position, the hitch assembly is substantially restricted from moving out of the first position, and the hitch assembly and the guide assembly are substantially restricted from rotating relative to the carrier member.

In another example of this embodiment, the first plate and the second plate terminate at a second radial distance from the pivot axis. In a further example, the guide assembly further includes at least one spacer coupling the first guide plate to the second guide plate; and at least one wear plate disposed between the first guide plate and the second guide plate, the at least one wear plate having a radially-defined edge that is disposed in contact with the first guide plate or second guide plate. In a different example, the hitch assembly includes a draw bar having a defined length, width, and thickness, the thickness being less than the first and second distances; a hitch link adapted to be coupled to the frame; and a hitch link coupler coupling the hitch link to the draw bar, the hitch link coupler including a grab bar.

In a further embodiment of the present disclosure, a hitch module is provided for coupling to a frame of a work machine or work implement. The hitch module includes a carrier assembly including a first plate, a second plate, and at least one coupler plate coupling the first and second plates to one another, the first and second plates being disposed parallel to and spaced from one another by a first distance, where a pivot axis is defined through both the first and second plates; a guide assembly defining along a longitudinal axis and being pivotally coupled to the carrier assembly about the pivot axis, the guide assembly including a first guide plate and a second guide plate coupled to and spaced by a second distance from one another, where the second distance is greater than the first distance; and a hitch assembly disposed at least partially between the first and second plates of the carrier assembly and the first and the second guide plates of the guide assembly, the hitch assembly including a draw bar and a hitch link; wherein, the hitch assembly is pivotal about the pivot axis relative to the carrier assembly and movable along the longitudinal axis relative to the guide assembly.

In one example of this embodiment, the hitch link is longitudinally movable between a first position and a second position relative to the guide assembly; and the hitch link is pivotable about the pivot axis between a first angle and a second angle. In a second example, the hitch link is movable to any one of a plurality of positions relative to the guide assembly and carrier assembly, the plurality of positions defined within a trapezoidal-shaped area formed by at least four points, wherein a first point is at the first position and the first angle, a second point is at the first position and the second angle, a third point is at the second position and the first angle, and a fourth point is at the second position and the second angle.

In another example of this embodiment, a first through-hole is axially aligned through the first guide plate, the first through-hole being spaced a first radial distance from the pivot axis; an arc-shaped through-hole is defined in the first plate, the arc-shaped through-hole defined at the first radial distance from the pivot axis; a second through-hole is defined in the hitch assembly; a third through-hole is defined in the second plate and defined at the first radial distance from the pivot axis; and a fourth through-hole is defined in the second guide plate and axially aligned with the first through-hole, the fourth through-hole defined at the first radial distance from the pivot axis; wherein, the first through-hole, the arc-shaped through-hole, and the second through-hole are aligned with one another when the hitch assembly is in the first position; further wherein, the first through-hole misaligned from the second through-hole when the hitch assembly is in the second position.

In a further example, a pin is axially aligned with the first through-hole and configured to move axially along a central axis defined by the first through-hole, the pin being positionable in at least a first axial position, a second axial position, and a third axial position, wherein in the first axial position, the hitch assembly is not in the first position and the pin is disposed through a portion of the first through-hole and the arc-shaped through-hole; in the second axial position the hitch assembly is in the first position, the guide assembly is not axially aligned with the longitudinal axis, and the pin is disposed through the first through-hole, the arc-shaped through-hole, and the second through-hole; and in the third axial position, the hitch assembly is in the first position, the guide assembly is aligned with the longitudinal axis, and the pin is disposed through the first through hole, the arc-shaped through-hole, the second through-hole, the third through-hole and the fourth through-hole.

In a different example, a method of coupling the hitch module to the frame includes providing a hitch coupler coupled to the frame of a work machine; positioning the pin in its first axial position; maneuvering the hitch link to any position within the trapezoidal-shaped area until the hitch link is aligned with the hitch coupler; coupling the hitch link to the hitch coupler; moving the hitch assembly along the longitudinal axis until it reaches the first distance from the carrier assembly; biasing the pin from its first axial position to its second axial position; aligning the hitch link such that the hitch link is not angularly disposed relative to the longitudinal axis; biasing the pin from its second axial position to its third axial position; and coupling the hitch module to the frame.

In another embodiment of the present disclosure, a hitch module is provided for coupling to a frame of a work machine or work implement. The hitch module includes a carrier assembly including a first plate, a second plate, and at least one coupler plate coupling the first and second plates to one another, the first and second plates defining a pivot axis and being disposed parallel to and spaced from one another by a first distance, where the first plate defines an arc-shaped through-hole that defines a central axis therethrough, the central axis being disposed a first radial distance from the pivot axis; a guide assembly being pivotally coupled to the carrier assembly about the pivot axis, the guide assembly including a first guide plate, a second guide plate coupled to and spaced by a second distance from the first guide plate, at least two spacers, at least two wear plates disposed between the first and second guide plates, a U-shaped frame member coupled to the first guide plate, a pin axially movable relative to the first and second guide plates, and a spring disposed between the U-shaped frame member and the first guide plate, wherein the second distance is greater than the first distance; and a hitch assembly disposed at least partially between the first and second plates of the carrier assembly and the first and the second guide plates of the guide assembly, the hitch assembly including an elongated draw bar, a hitch link coupler, and a hitch link adapted to be coupled to the frame, the hitch link coupler coupling the draw bar and hitch link to one another; wherein, the hitch assembly and guide assembly are pivotal about the pivot axis relative to the carrier assembly; further wherein, the hitch assembly is slidably movable along a longitudinal axis relative to the carrier assembly and guide assembly.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 16a is a side view of one embodiment of a hitch module with a pin contact;

FIG. 16b is a side view of the hitch module of FIG. 16a with the pin in the third axial position; and FIG. 16c is a top view of the pin section of FIG. 16a.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
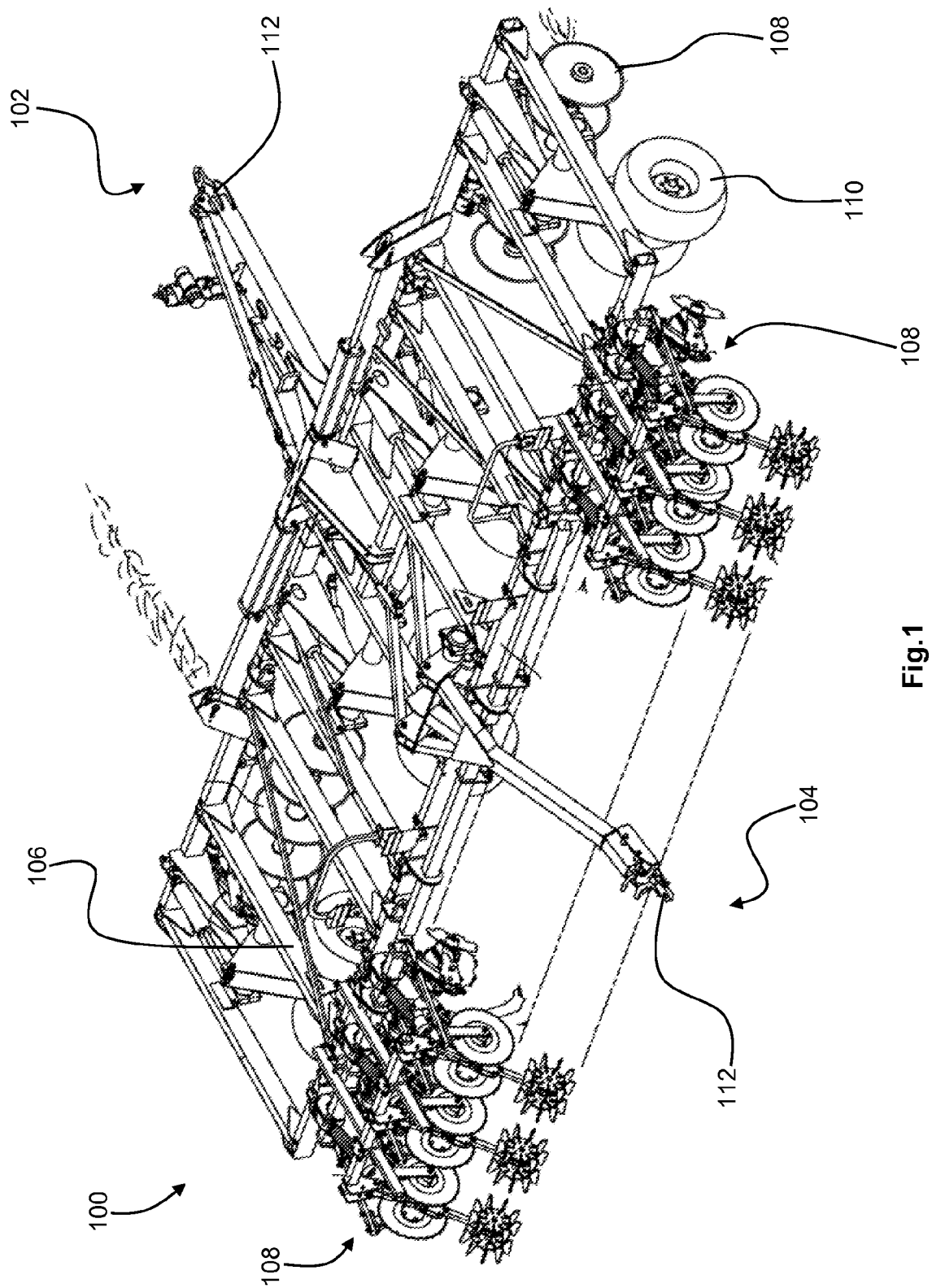
FIG. 1 is an elevated perspective view of a towed assembly with at least one hitch module.

Referring to FIG. 1, a towed assembly 100 is shown. The towed assembly 100 may have a frame 106 with a plurality of implements 108 coupled thereto and be configured to travel along an underlying surface. The frame 106 may also have at least one wheel 110 coupled thereto. The wheel 110 may space the frame 106 and the implements 108 a predefined distance from the underlying surface to allow the implements 108 to engage the underlying surface as desired by a user. In one embodiment, the towed assembly 100 may require a work machine such as a tractor to pull the towed assembly 100 along the underlying surface in order for the implements 108 to engage the underlying surface.

In FIG. 1, one non-limiting example is shown of how a work machine or tractor may be coupled to the towed assembly 100. More specifically, the towed assembly 100 may have a front end 102 and a rear end 104 that each have a hitch module 112 coupled thereto. The hitch module 112 at the front end 102 may be configured to couple to the work machine, tractor or other pulling member to allow the towed assembly 100 to travel over the underlying surface. Further, the hitch module 112 at the rear end 104 of the towed assembly 100 may be configured to couple to a secondary towed assembly (not shown), such as a nutrient or fertilizer applicator.

In one embodiment, a tillage implement such as a cultivator may be coupled behind a tractor, and the applicator (e.g., nutrient or fertilizer applicator or other chemicals) may be coupled to the hitch module 112 of the cultivator. The applicator includes a wheeled platform on which a tank is mounted; the tank holds and distributes chemicals (e.g. anhydrous ammonia) or solutions. In another embodiment, a seed planter may be coupled to the rear of the work machine or tractor, and then a chemical tank may be coupled to the hitch module 112 of the seed planter. In these aforementioned embodiments, however, the order or arrangement of the implement and applicator may be switched such that the applicator is positioned between the work machine or tractor and the implement. Other combinations of known implements and applicators may be coupled to one another or the work machine via a hitch module. As such, the work machine or tractor may drive both the towed assembly 100 and the secondary towed assembly via the hitch modules 112 at both the front end 102 and the rear end 104.

While hitch modules 112 for a towed assembly 100 have been described above, this disclosure is not limited to such a configuration. More specifically, the hitch modules described herein can be used in a plurality of different applications, and it is not limited to any one application. For example, the hitch module can be coupled to a tractor, a truck, a car, a trailer, or any other device that may be removably coupled to a towed assembly.

Figure 2:
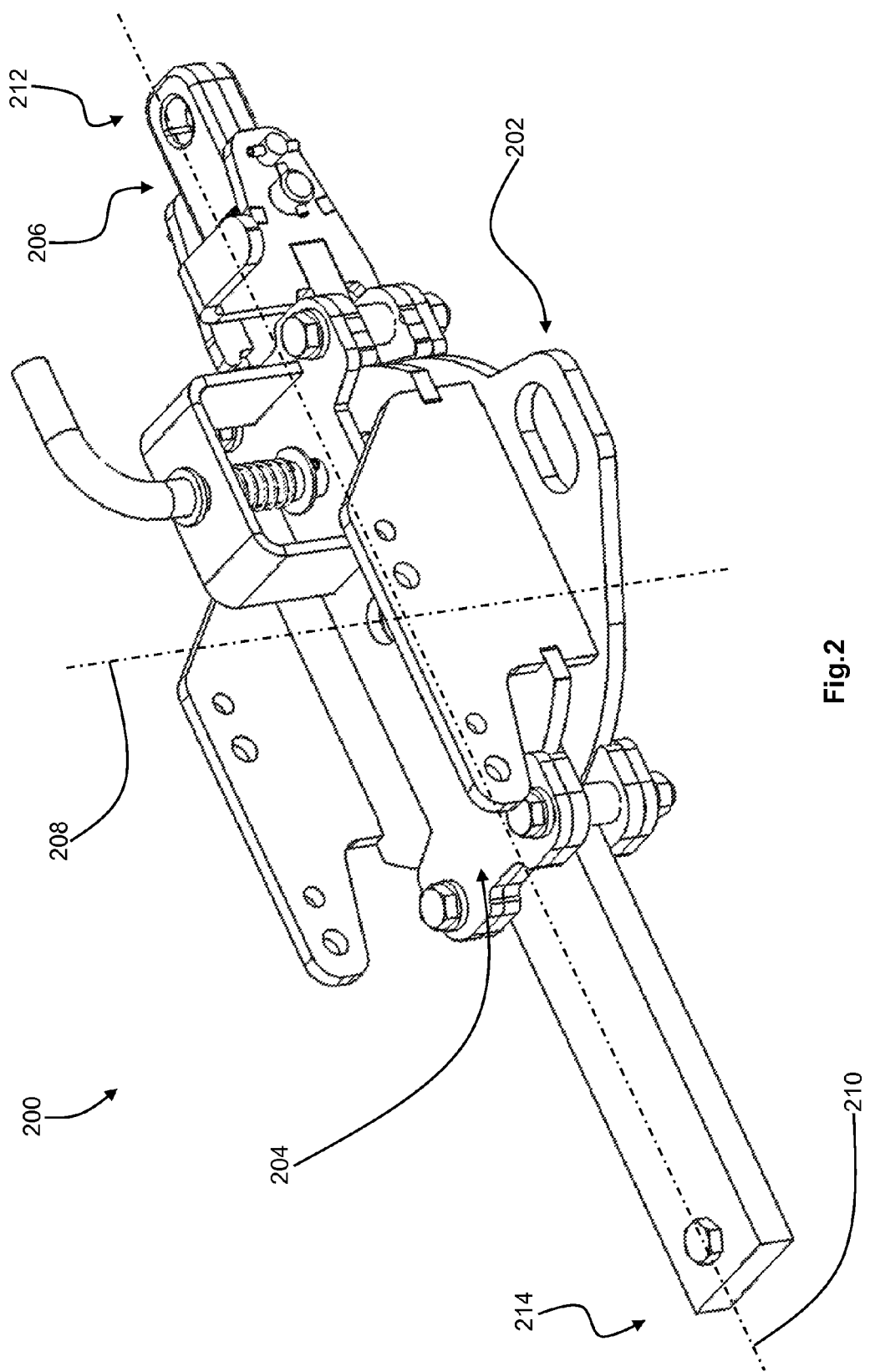
FIG. 2 is an isolated perspective view of one embodiment of a hitch module.

Referring now to FIG. 2, a hitch module 200 is shown isolated from any frame member. The hitch module 200 may be composed of at least a carrier assembly 202, a guide assembly 204, and a hitch assembly 206. The guide assembly 204 may be pivotally coupled to the carrier assembly 202 in such a way that allows the guide assembly 204 to pivot relative to the carrier assembly 202 about a pivot axis 208. The pivot axis 208 may be defined by a central portion of both the carrier assembly 202 and the guide assembly 204. Further, the hitch assembly 206 may be slidably coupled to the guide assembly 204 along a longitudinal axis 210 defined along the length of the hitch assembly 206. In the embodiment shown in FIG. 2, the longitudinal axis 210 may extend from a front portion 212 to a rear portion 214. However, the angular orientation of the longitudinal axis 210 relative to front portion 212 and the rear portion 214 may also be altered as the guide assembly 204 pivots relative to the carrier assembly 202.

Figure 3:
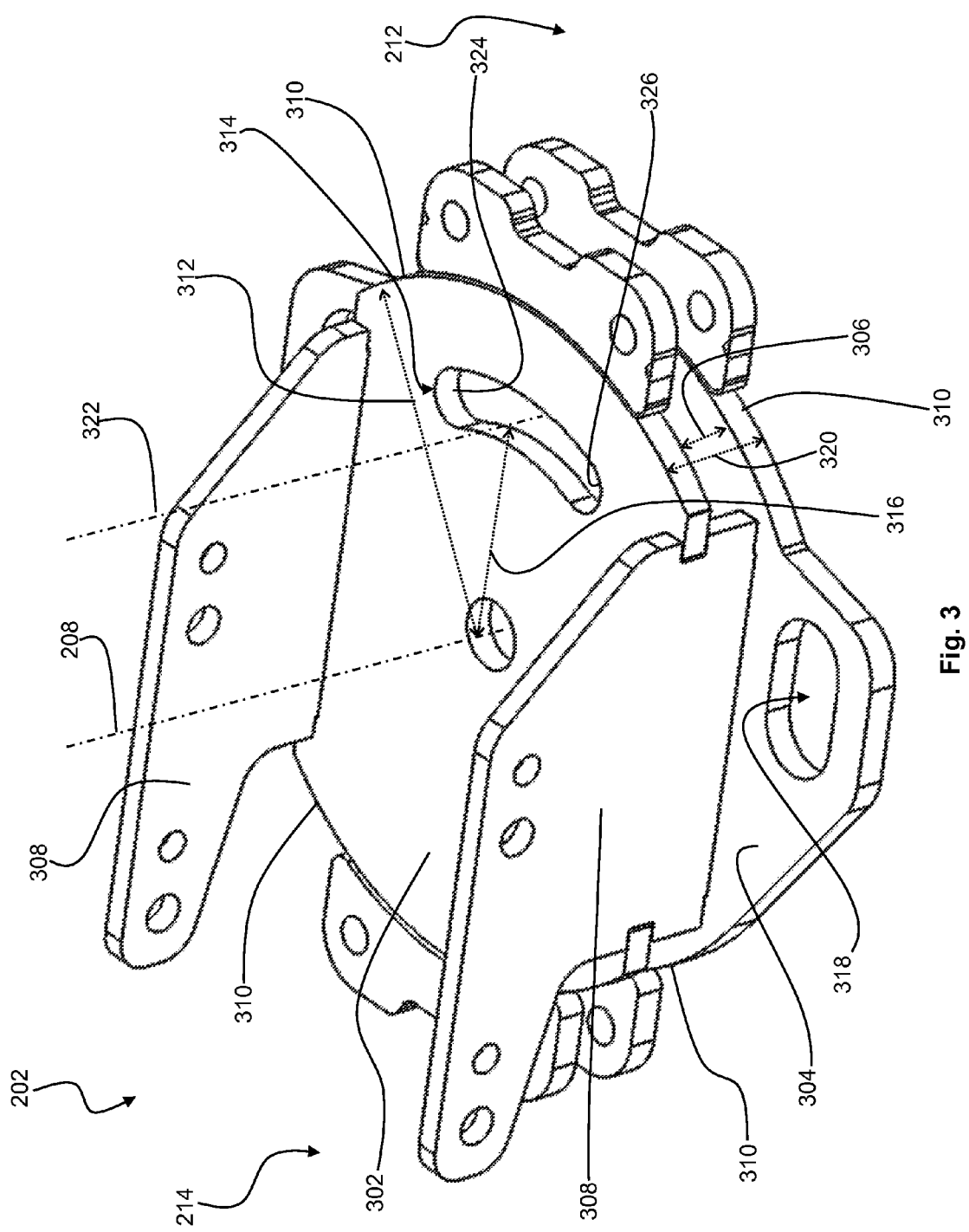
FIG. 3 is an isolated perspective view of a carrier assembly from the hitch module of FIG. 2.

To better show the carrier assembly 202 of the hitch module 200 described above, an isolated view of the carrier assembly 202 is shown in FIG. 3. More specifically, a first plate 302 and a second plate 304 are shown parallel to, and spaced apart from, one another. The first plate 302 and the second plate 304 can be spaced apart from one another to define a middle region 306 therebetween and have a first thickness 320. The middle region 306 may be the distance the first and second plates 302, 304 are spaced from one another. Further, the first thickness 320 may be defined by the distance between the outermost surfaces of the first plate 302 relative to the second plate 304. Further, the middle region 306 may be sufficiently sized to allow at least a portion of the hitch assembly 206 to at least partially slide there through.

At least one coupler plate 308 may be coupled to both the first plate 302 and the second plate 304. The coupler plate 308 may be coupled to, and extend perpendicularly from, a surface of the second plate 304. Further, the coupled plate 308 may be coupled to the first plate 302 and the second plate 304 to maintain the spacing of the middle region 306 and the parallel alignment of the first plate 302 and the second plate 304.

The first plate 302 may also have an arc-shaped through-hole 314 defined therein. The arc-shaped through-hole 314 may be a through-hole following an arc-shaped path defined in the first plate 302. The arc-shaped path may have a radius that is a first radial distance 316 from the pivot axis 208. The arc-shaped through-hole 314 may also be positioned towards the front portion 212 of the first plate 302 and extend between a first end wall 324 and a second end wall 326, which are defined in the first plate 302.

Similarly, the second plate 304 may have a third through-hole 702 (FIG. 7) disposed therein. The third through-hole 702 may be spaced the first radial distance 316 from the pivot axis 208 and be substantially circular in shape. The third through-hole 702 may also define a central axis 322 that extends through the arc-shaped through-hole 314. The central axis 322 may be aligned with and pass through the arc-shaped through-hole 314.

Both the front portion 212 and the rear portion 214 of the first plate 302 and the second plate 304 may terminate at an arc-shaped radial edge 310. Each arc-shaped radial edge 310 may be defined by an arc-shaped terminus of the respective first or second plate 302, 304 that is a second radial distance 312 from the pivot axis 208. In one embodiment, the second plate 304 may have at least one safety through-hole 318 positioned therein. The safety through-hole 318 may be sized to receive a secondary coupler (not shown) that can be coupled to the hitch module 200. The secondary coupler may provide an additional means for coupling the towed assembly to the hitch module 200.

Figure 4:
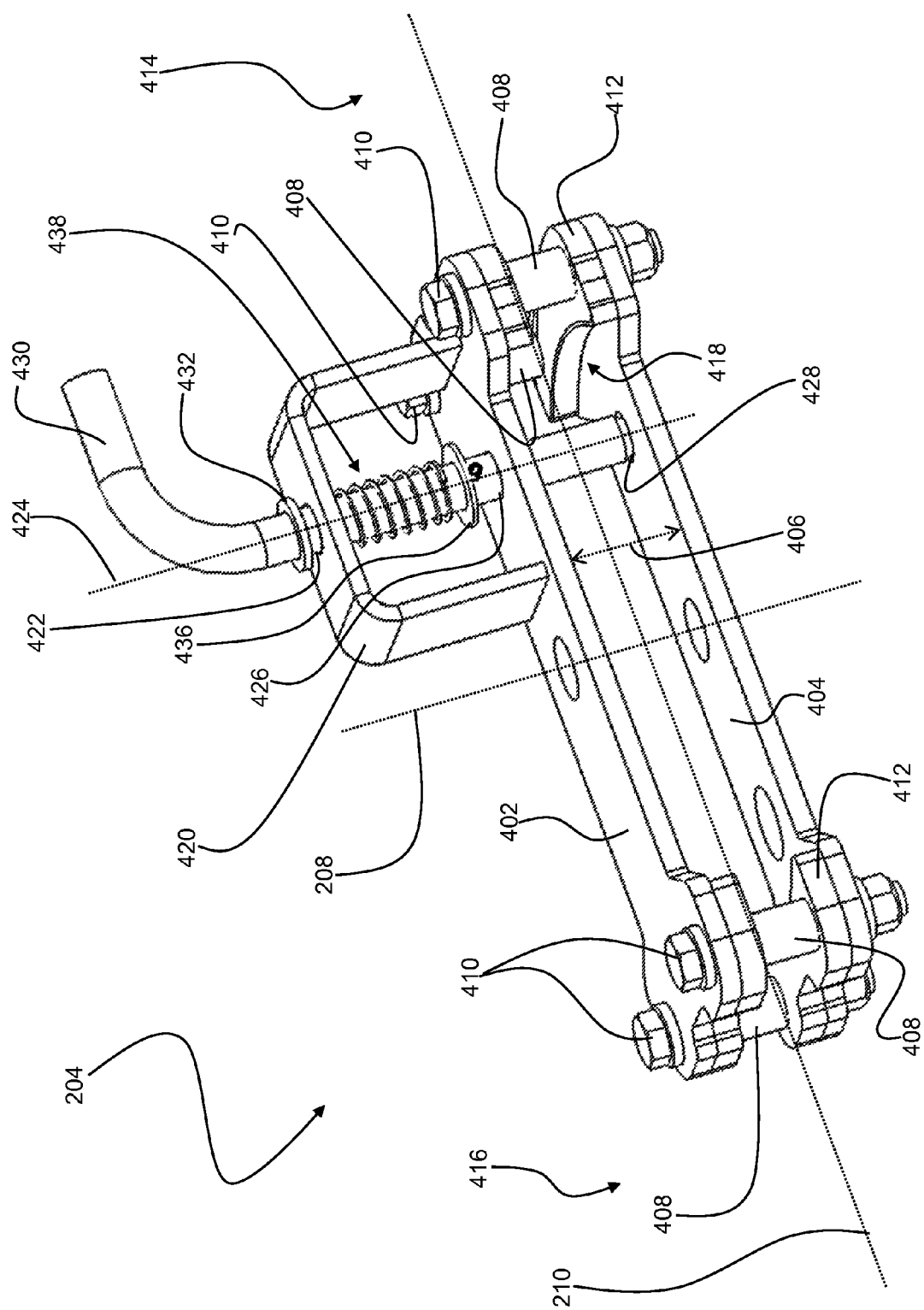
FIG. 4 is an isolated perspective view of a guide assembly from the hitch module of FIG. 2.

Now referring to FIG. 4, the guide assembly 204 is more clearly shown. The guide assembly 204 may include a first guide plate 402 coupled to a second guide plate 404 to define a second interior region 406. The second interior region 406 may correspond in thickness with the first thickness 320 of the carrier assembly 202. More specifically, the second interior region 406 may be sufficiently sized to allow at least a portion of the carrier assembly 202 to be disposed therein. In one embodiment, the size of the second interior region 406 may be maintained by spacers 408 disposed at each coupling location with couplers or fasteners 410.

In yet another embodiment, a wear plate 412 may be positioned along an inner surface of each the first and second guide plate 402, 404. The guide assembly 204 may have multiple wear plates 412 disposed along the first and second guide plate 402, 404 at a first end 414 and a second end 416. Each wear plate 412 may have a thickness that is substantially the same as the first and second plate 302, 304. Further, each wear plate 412 may have an inner concave surface 418 that correlates with the arc-shaped radial edge 310 of the respective first or second plate 302, 304.

The spacers 408 and couplers 410 may position the wear plates 412 so they are aligned with the first and second plate 302, 304 when the carrier assembly 202 is disposed within the guide assembly 204. In one embodiment, the wear plates 412 may be made of a material that reduces friction between the inner concave surface 418 of the wear plates 412 and the arc-shaped radial edge 310 of the first and second plate 302, 304.

The first guide plate 402 may also have a U-shaped frame member 420 coupled thereto. The U-shaped frame member 420 can be mechanically coupled to the first guide plate 402 and define an interior region between the U-shaped frame member 420 and the first guide plate 402. The U-shaped frame member 420 can also have defined therein a frame through-hole 422 along a frame through-hole axis 424. Also aligned with the frame through-hole axis 424 may be a first through-hole 426 and a fourth through-hole 428. The first through-hole 426 may be defined through the first guide plate 402 and the fourth through-hole 428 may be defined through the second guide plate 404. In one embodiment, the frame through-hole 422, the first through-hole 426, and the fourth through-hole 428 may all have approximately the same diameter and be axially aligned with axis 424.

Also aligned with frame through-hole axis 424 may be a pin 430. The pin 430 may have a substantially circular cross-section and a diameter that is equal to or less than the diameter of the frame through-hole 422, the first through-hole 426, and the fourth through-hole 428. The pin 430 may have a first stop 432 and a second stop 436. The first stop 432 may be disposed along a portion of the pin 430 that is outside of an interior region of the U-shaped frame member 420. The first stop 432 may contact a portion of the U-shaped frame member 420 when the pin 430 is in a fully seated position. Further, when the pin 430 is in the fully seated position, the pin 430 may at least partially be disposed within the fourth through-hole 428.

Similarly, the second stop 436 may be disposed within the interior region of the U-shaped frame member 420. As shown in FIG. 4, the interior region is defined between the U-shaped frame member 420 and the first guide plate 402. As such, the second stop 436 may be positioned along the pin 430 to allow the pin 430 to become disposed in a first axial position 802 (FIG. 8). In the first axial position 802, the pin 430 may be moved axially along the frame through-hole axis 424 until a tip of the pin 430 terminates proximate to the first through-hole 426.

In one embodiment, the pin 430 may have a spring 438 disposed around the pin 430 and between the second stop 436 and the U-shaped frame member 420 in the interior region. The spring 438 may provide a biasing force to the second stop 436 to move the pin 430 axially toward the fourth through-hole 428. The spring 438 may provide sufficient biasing force to position the pin 430 in the fully seated position when the pin 430 is unencumbered along the frame through-hole axis 424.

Figure 5:
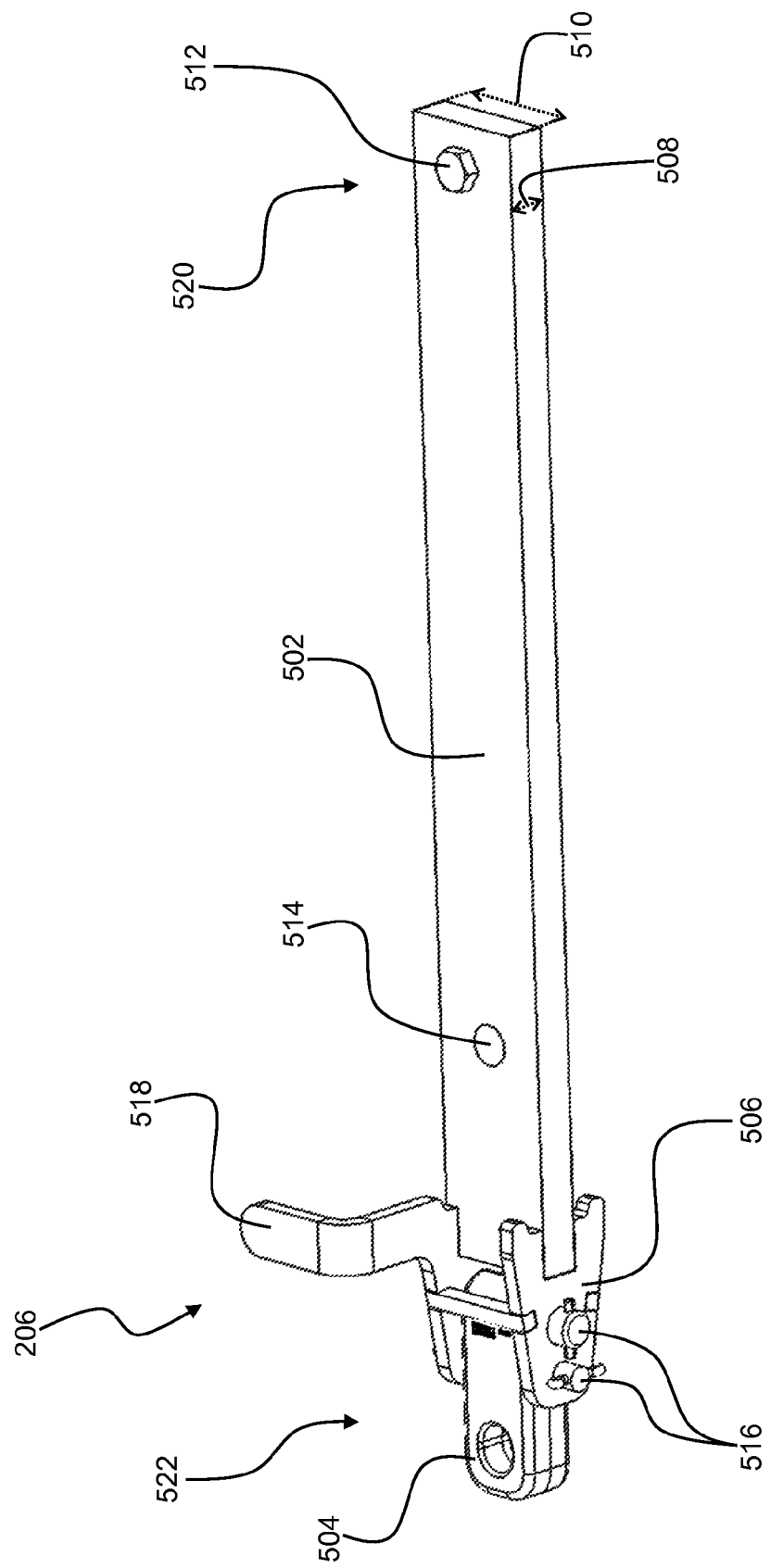
FIG. 5 is an isolated perspective view of a hitch assembly from the hitch module of FIG. 2.

Referring now to FIG. 5 the hitch assembly 206 is shown in more detail and isolated from the carrier assembly 202 and the guide assembly 204. The hitch assembly 206 may have a draw bar 502 coupled to a hitch link 504 through one or more hitch link couplers 506. The draw bar 502 may have a base end 520 and a receiving end 522 and be substantially rectangular along a cross-section. The cross-section may have a thickness 508 that corresponds in dimension with the middle region 306. That is to say, the thickness 508 of the draw bar 502 may be sufficiently sized to allow the draw bar 502 to be disposed between the first and second plates 302, 304 of the carrier assembly 202.

A width 510 of the draw bar 502 may be sufficiently sized to allow the draw bar 502 to become disposed between each of the spacers 408 along the longitudinal axis 210 of the guide assembly 204. In one embodiment, there may be two spacers 408 at both the first end 414 and the second end 416 of the guide assembly 204. The spacers 408 at each end may be spaced to correspond with the width 510 of the draw bar 502 to allow the draw bar 502 to be positioned therebetween while also maintaining alignment of the guide assembly 204 and the hitch assembly 206. That is to say, the spacers 408 may allow the draw bar 502 to slide axially along the longitudinal axis 210 relative to the guide assembly 204, but the spacers 408 may substantially limit the draw bar 502 from pivoting or moving transversely relative to the guide assembly 204. Rather, if a torsional force is applied to the draw bar 502, the torsional force may be transmitted through the spacers 408 to the guide assembly 204. Accordingly, if a torsional force is applied to the hitch assembly 206, the hitch assembly 206 and the guide assembly 204 may rotate about the pivot axis 208 relative to the carrier member 202 as substantially one assembly.

The draw bar 502 may also have a stop 512 disposed near the base end thereof. The stop 512 may be a piece of material protruding from at least one surface of the draw bar 502 and that extends beyond the thickness 508 of the cross-section. Alternatively, a fastener (e.g., screw, bolt head, washer, nut, etc.) may be used to form the stop 512. In any event, the stop 512 may be sized to contact a portion of the guide assembly 204 when the draw bar 502 is disposed therein and extended to a maximum position.

Alternatively, the draw bar 502 may have a through-hole 514 disposed proximate to a receiving end 522 of the draw bar 502. The through-hole 514 may have a diameter that is greater than the diameter of the pin 430 of the guide assembly 204. The second through-hole 514 may be positioned so when the draw bar 502 is disposed within the guide assembly 204 and axially positioned at a minimum position relative to the guide assembly 204, the pin 430 can be positioned at least partially in the second through-hole 514.

The hitch link coupler 506 may couple the draw bar 502 to the hitch link 504. The hitch link coupler 506 may be welded, bolted, riveted, or otherwise coupled to the draw bar 502 on one side, and removably coupled to the hitch link 504 on the other side. More specifically, the hitch link coupler 506 may define two through-holes (not shown) therethrough that correspond with through holes (not shown) of the hitch link 504. Further still, lockpins 516 or other fasteners may be positioned through each of the two through-holes to couple the hitch link 504 to the hitch link coupler 506.

In one embodiment, the hitch link coupler 506 may be two plates coupled to one another. One of the plates may have a substantially 90 degree bend disposed about a distal end relative to the hitch link 504 to form a grab bar 518. The grab bar 518 may be manipulated by a user to alter the location of the hitch link 504.

Figure 6:
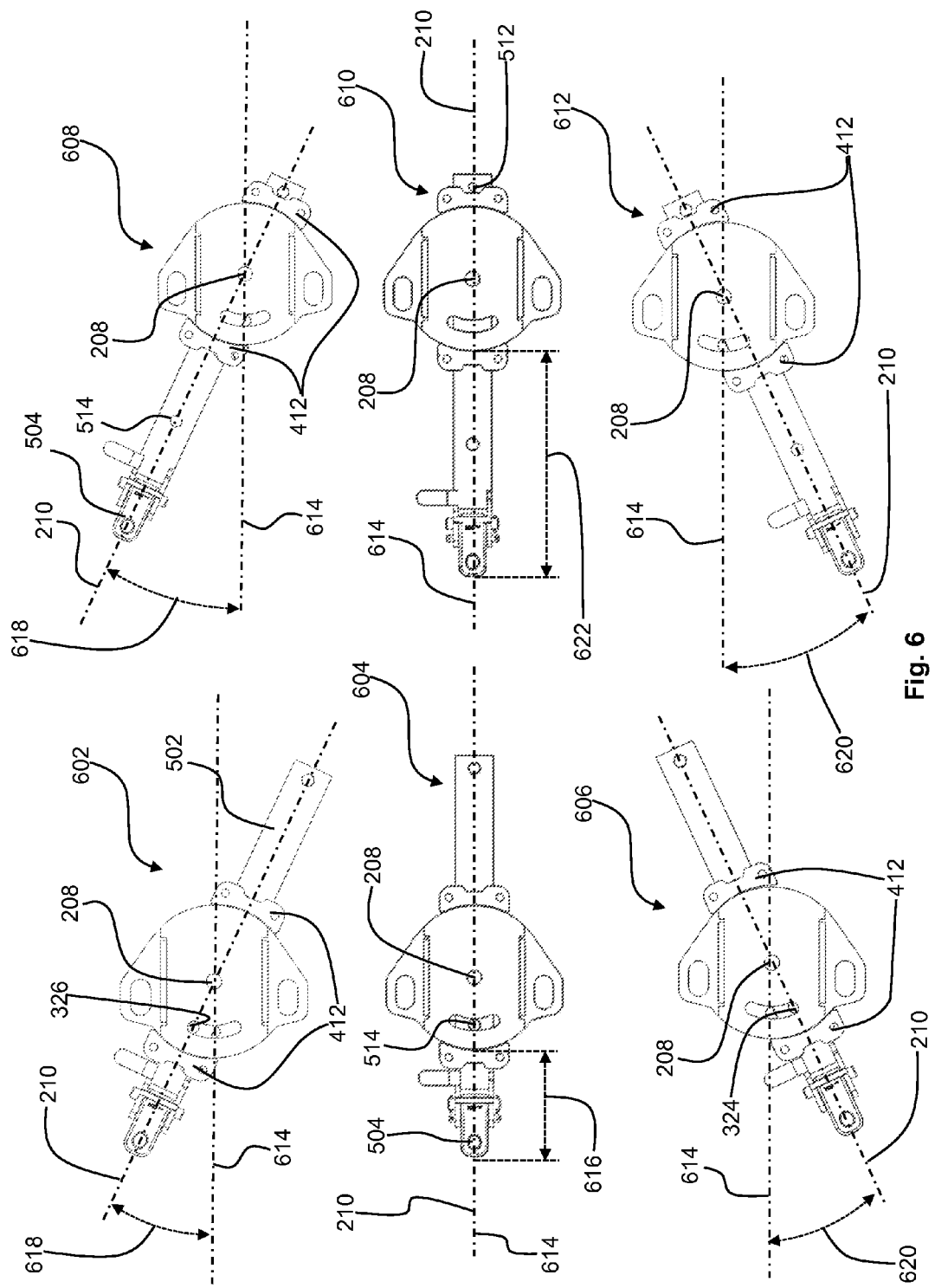
FIG. 6 is a topside view of the hitch module in several different spatial orientations.

Referring now to FIG. 6, the hitch module 200 is shown with the first guide plate 402 removed and with the guide assembly 204 and hitch link assembly 206 in several different configurations. More specifically, the hitch module 200 is shown with the hitch assembly 206 in a first position 602, a second position 604, a third position 606, a fourth position 608, a fifth position 610, and a sixth position 612.

In the second position 604, the longitudinal axis 210 defined by the hitch assembly 206 may be aligned with a carrier axis 614 defined along a midpoint of the carrier assembly 202. The hitch assembly 206 may be disposed at a neutral angle relative to the carrier member 202 when the longitudinal axis 210 and the carrier axis 614 align. Further, the hitch link 504 may be spaced a first distance 616 from the carrier assembly 202 in the second position 604. The first distance 616 may be the minimum axial distance along the longitudinal axis 210 allowable between the hitch link 504 and the carrier assembly 202. Further still, when the hitch link 504 is spaced by the first distance 616 from the carrier member 202, the through-hole 514 may be substantially aligned with the arc-shaped through-hole 314.

When the guide assembly 204 and the hitch assembly 206 are in the first position 602, the hitch link 504 may be spaced the first distance 616 from the carrier assembly 202 and the longitudinal axis 210 may be oriented at a positive offset angle 618 from the carrier axis 614. The positive offset angle 618 may be the maximum positive angular position of the guide assembly 204 and the hitch assembly 206 relative to the carrier assembly 202 about the pivot axis 208. The positive offset angle 618 may also position the second through-hole 514 proximate to the second end wall 326 of the arc-shaped through-hole 314. In this orientation, when the pin 430 is positioned partially in the arc-shaped through-hole 314 it may at least partially contact the second end wall 326 to restrict any further movement in the positive angular direction.

Similarly, when the guide assembly 204 and the hitch assembly 206 are in the third position 606, the hitch link 504 may be spaced the first distance 616 from the carrier assembly 202 and the longitudinal axis 210 may be oriented at a negative offset angle 620 from the carrier axis 614. For purposes of this disclosure, positive offset angle 618 or positive angle refers to an angular displacement of the hitch assembly or hitch link 504 relative to the carrier axis 614. Likewise, negative offset angle 620 or negative angle also refers to an angular displacement of the hitch assembly or hitch link 504 relative to the carrier axis 614. The use of the terms "positive" and "negative" may also be interchangeably referred to as clockwise and counter clockwise, respectively. In other words, this disclosure uses positive and negative offset angles to refer to an angular or pivotal direction relative to the carrier axis 614.

The negative offset angle 620 may be the minimum negative rotation or maximum counter clockwise rotation of the guide assembly 204 and the hitch assembly 206 relative to the carrier assembly 202 along the pivot axis 208. The negative offset angle 620 may also position the through-hole 514 proximate to the first end wall 324 of the arc-shaped through-hole 314. In this orientation, when the pin 430 is positioned partially in the arc-shaped through-hole 314 it may at least partially contact the first end wall 324 to restrict any further movement in the negative angular direction.

The fifth position 610 shows the guide assembly 204 and the hitch assembly 206 in the neutral angle orientation with the hitch link 504 spaced a second distance 622 from the carrier assembly 202. While the hitch link 504 is spaced the second distance 622, the guide assembly 204 and the hitch assembly 206 may rotate about the pivot axis 208 between the positive offset angle 618 and the negative offset angle 620 as described above. Further, the hitch assembly 206 may be restricted from moving any farther from the carrier assembly 202 because of contact between the third stop 512 and the wear plates 412 and/or the guide assembly 204. That is to say, the draw bar 502 may not extend any further than the second distance 622 along the longitudinal axis 210 because the third stop 512 may at least partially contact the wear plates 412 and/or the guide assembly 204 when the draw bar 502 is spaced at the second distance 622.

The relationship of the wear plates 412 with the arc-shaped radial edge 310 is also more clearly shown in FIG. 6. More specifically, the inner concave surface 418 of the wear plates 412 may be concentric with the pivot axis 208. Similarly, the arc-shaped radial edges 310 of the first and second plate 302, 304 may also be concentric with the pivot axis 208. In this embodiment, as the guide assembly 204 and the hitch assembly 206 rotate between the positive offset angle 618 and the negative offset angle 620, the wear plates 412 may slide along the arc-shaped radial edge 310 of the first and second plate 302, 304.

While the draw bar 502 and hitch link 504 have been described with respect to the first and second distances 618, 622 and the positive and negative offset angles 618, 620, this disclosure is not limited to the particular orientations described and shown. More specifically, the draw bar 502 or hitch link 504 can be positioned at any location between the first distance 616 and the second distance 622. Further still, the guide assembly 204 and the hitch assembly 206 can be disposed at many different angles relative to the carrier assembly 202 and this disclosure is not limited to any particular angular orientation.

Figure 7:
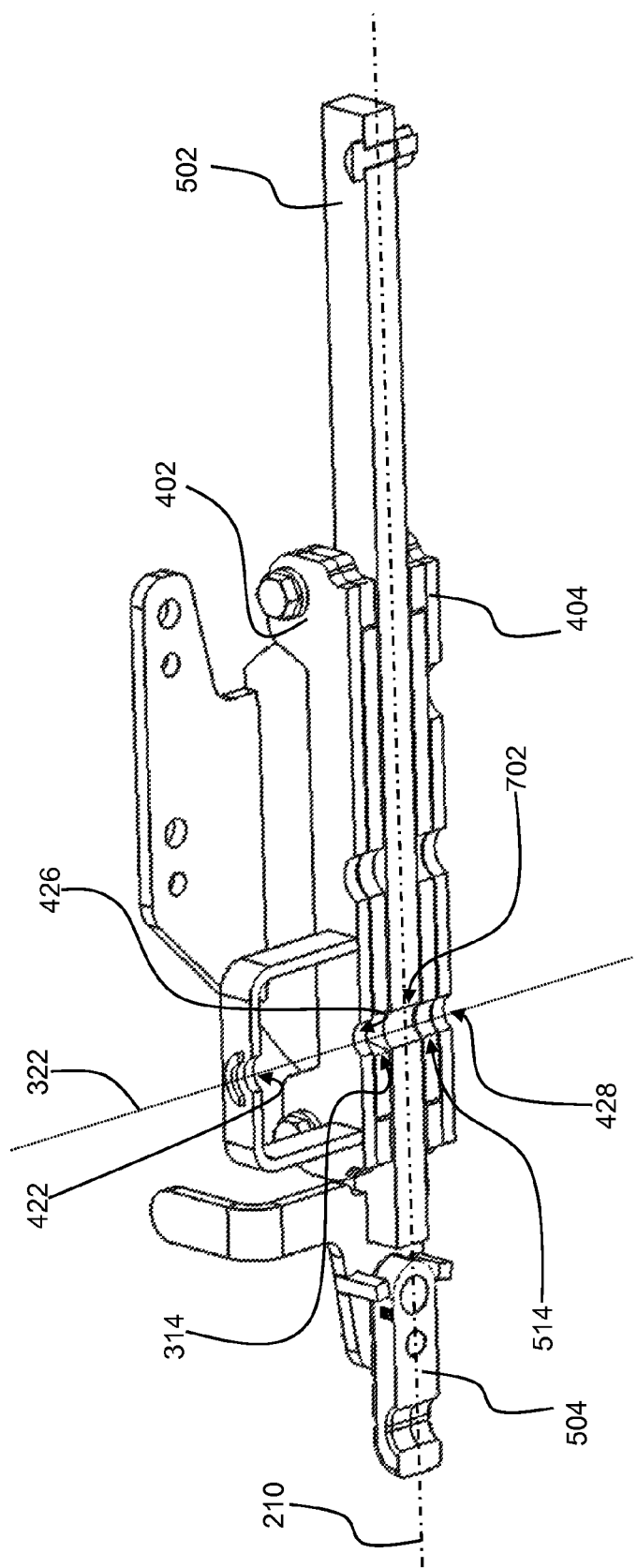
FIG. 7 is a longitudinal cross-section perspective view of the hitch module of FIG. 2.

Now referring to FIG. 7, a cross-sectional view along the longitudinal axis 210 is shown. More specifically, FIG. 7 shows the hitch module 200 in the neutral angle with the hitch assembly 206 at the first distance 616 from the carrier assembly 202. In one embodiment, this may be the only orientation of the hitch module 200 that allows each of the through holes 422, 426, 314, 514, 702, and 428 to be axially aligned with one another along the frame through-hole axis 424. In the embodiment shown in FIG. 7, the pin 430 (not shown in FIG. 7) may become disposed through each of the through-holes 422, 426, 314, 514, 702, and 428 thereby substantially locking or coupling the hitch module 200 in its neutral angular position with the hitch assembly 206 at the first distance 616 from the carrier assembly 202.

While the through-holes 422, 426, 314, 514, 702, and 428 have been described in the above embodiment as only being aligned in one particular orientation, this disclosure is not limited to such a configuration. More specifically, there may be multiple positions where through-holes can align with one another to allow a pin to become disposed therethrough to maintain the orientation of the hitch module 200. In one non-limiting example, through-holes can be axially aligned at the positive offset angle 618 and the negative offset angle 620. Through-holes may also be positioned with the hitch assembly 206 in the minimum or maximum position, or at any location therebetween. Through-holes can be defined at many different locations to allow the hitch module 200 to be substantially locked in many different orientations. Accordingly, this disclosure is not limited to any particular number or location of through-holes capable of locking the hitch module 200 in a particular position or orientation.

Figure 8A:
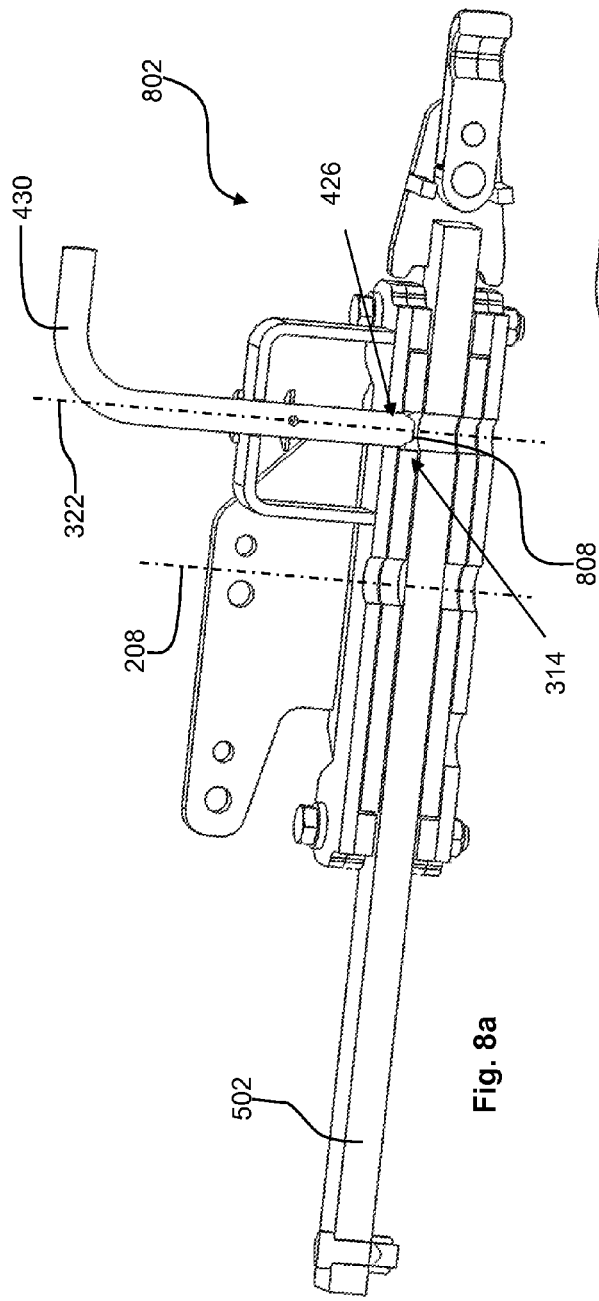
FIG. 8a is a longitudinal cross-section perspective view of the hitch module of FIG. 2 with a pin in a first axial position.
Figure 8B:
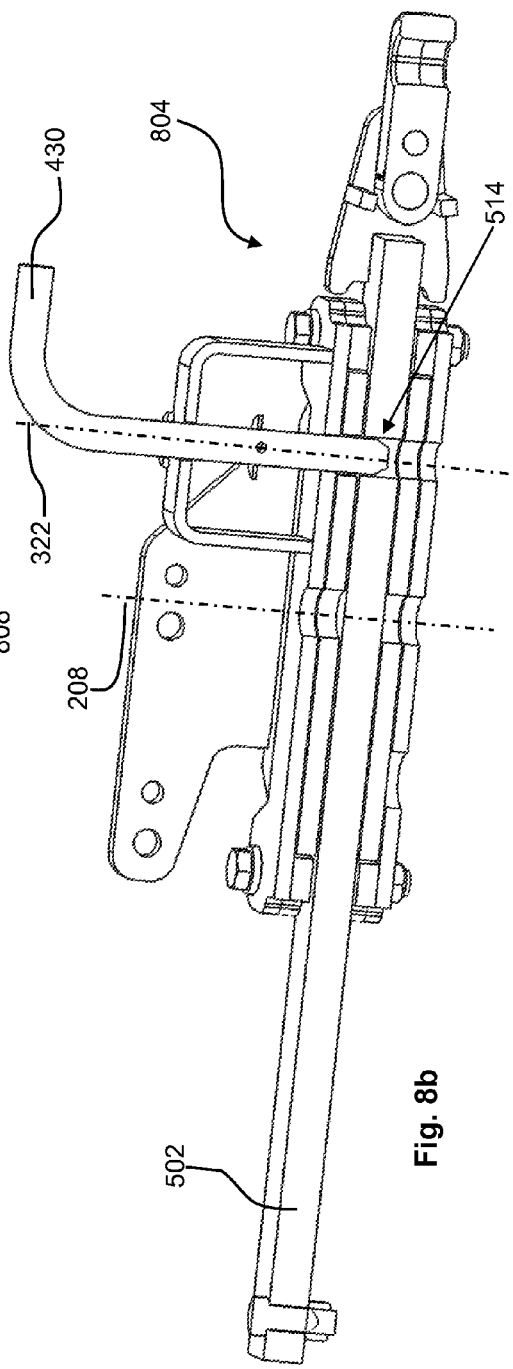
FIG. 8b is a longitudinal cross-section perspective view of the hitch module of FIG. 2 with the pin in a second axial position.
Figure 8C:
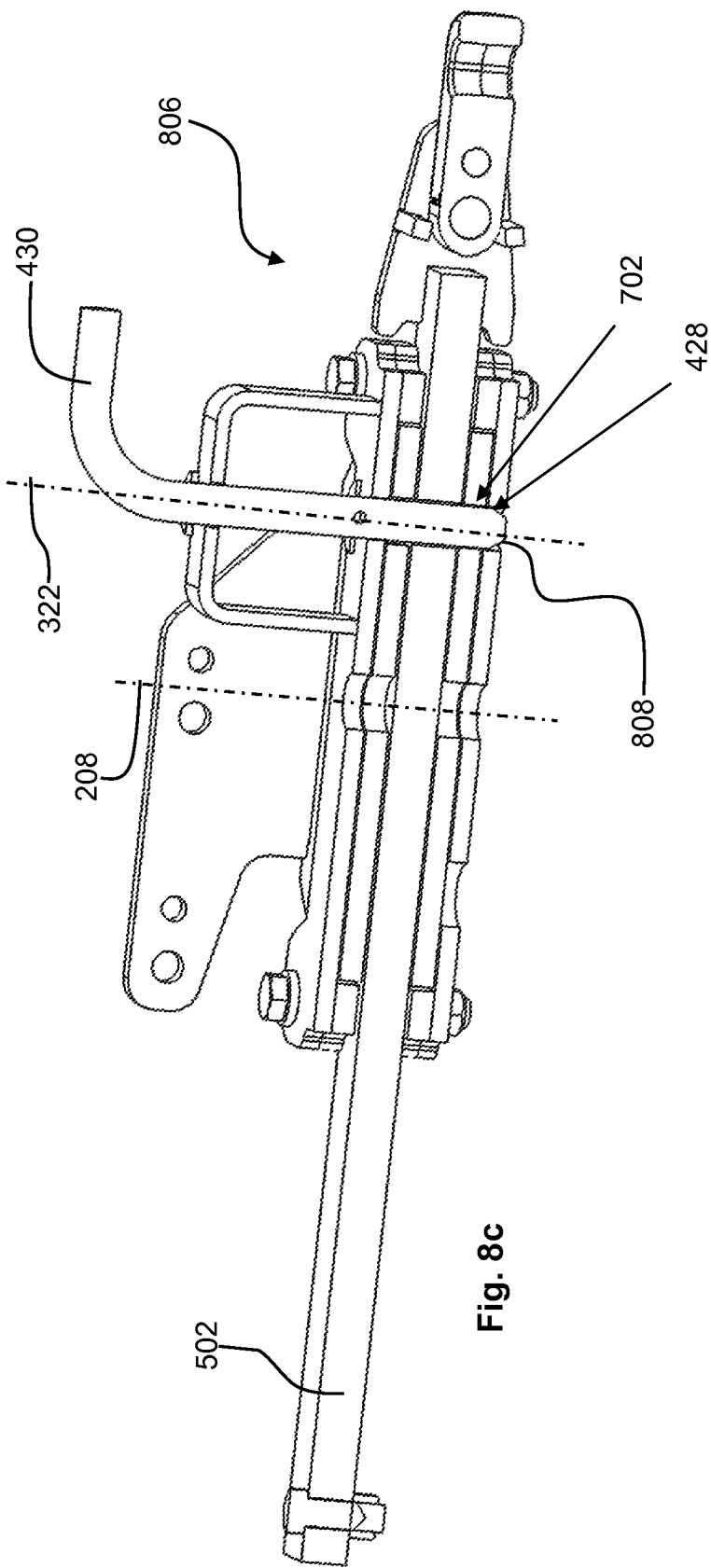
FIG. 8c is a longitudinal cross-section perspective view of the hitch module of FIG. 2 with the pin in a third axial position.

The positioning of the pin 430 along the frame through-hole axis 424 may also determine the available movement of the hitch link 504 relative to the carrier assembly 202. More specifically, the pin 430 may be oriented in the first axial position 802 as shown in FIG. 8a, a second axial position 804 as shown in FIG. 8b, and a third axial position 806 as shown by FIG. 8c.

In the first axial position 802 the pin 430 is disposed through only a portion of the first through-hole 426 and the arc-shaped through-hole 314. In the first axial position 802, the guide assembly 204 and the hitch assembly 206 may rotate about the pivot axis 208 relative to the carrier assembly 202. However, in the first axial position 802 the pin 430 may be at least partially disposed in the arc-shaped through-hole 314. Accordingly, the guide assembly 204 and the hitch assembly 206 may only pivot between the positive offset angle 618 and the negative offset angle 620 as permitted by the arc-shaped through-hole 314. More specifically, in the positive offset angle 618, the pin 430 may contact the first end wall 324 of the arc-shaped through-hole 314 to substantially restrict any further rotation in that direction relative to the carrier assembly 202. Similarly, in the negative offset angle 620, the pin 430 may contact the second end wall 326 of the arc-shaped through-hole 314 to substantially restrict any further rotation in that direction relative to the carrier assembly 202.

When the pin 430 is in the first axial position 802, the hitch assembly 206 may also be positioned at any distance between the first distance 616 and the second distance 622 relative to the carrier assembly 202. More specifically, the pin 430 may be at an axial position that does not interfere with the movement of the draw bar 502. Moreover, unless the pin 430 becomes disposed in the second through-hole 514 of the draw bar 502, the draw bar 502 may be able to move axially along the longitudinal axis 210 any distance between the first distance 616 and the second distance 622. Further, in the first axial position 802 the hitch module 200 may become disposed at any angular orientation between the positive offset angle 618 and the negative offset angle 620.

When the pin 430 is in the second axial position 804, the hitch assembly 206 may be substantially disposed and held at the first distance 616 from the carrier assembly 202. In the second axial position 804, the guide assembly 204 may pivot between any angular disposition between the positive offset angle 618 and the negative offset angle 620. More specifically, as shown in FIG. 8b, the pin 430 is disposed through the first through-hole 426, the arc-shaped through-hole 314, and the second through-hole 514. Similar to the first axial position 802, when the pin 430 is in the second axial position 804, the guide assembly 204 and the hitch assembly 206 may be oriented at any angular position relative to the carrier assembly 202 between the positive offset angle 618 and the negative offset angle 620. The pin 430 may be positioned through the arc-shaped through-hole 314 but is diametrically sized to slide or otherwise move therein until the pin 430 contacts the first or second end wall 324, 326 as described in more detail above.

In the second axial position 804, the pin 430 may be at least partially disposed within the second through-hole 514 of the draw bar 502. In this configuration, the pin 430 may substantially lock the draw bar 502 at the first distance 616 from the carrier assembly 202. That is to say, in the second axial position 804, the hitch module 200 may pivot between the positive offset angle 618 and the negative offset angle 620 but the hitch assembly 206 may be substantially restricted from moving axially along the longitudinal axis 210.

Now referring to the third axial position 806 as shown in FIG. 8c, the hitch assembly 206 may be substantially locked at the first distance 616 with the guide assembly 204 at the neutral angle. In the third axial position 806, the pin 430 may be disposed through the first through-hole 426, the arc-shaped through-hole 314, the second through-hole 514, the third through-hole 702 and the fourth through-hole 428. In this position, the pin 430 may substantially lock both the guide assembly 204 and the hitch assembly 206 to the carrier assembly 202 in their respective positions. More specifically, the hitch assembly 206 may be maintained in the neutral angle because the pin 430 creates a second pivot axis (the central axis 322) for the hitch assembly when the pin 430 is disposed through the third through-hole 702. When a force is applied to the hitch module 504 in the negative or positive offset angle 618, 620, the guide assembly 204 may try to pivot about both the central axis 322 and the pivot axis 208, which are offset from one another, thereby binding the guide assembly 204 and substantially restricting any movement out of the neutral angle.

As described in more detail above, the spring 438 (not shown in FIGS. 8a, 8b, and 8c) may bias the pin 430 axially towards the fourth through-hole 428. In other words, the spring 438 may bias the pin 430 towards the third axial position 806. In one embodiment, the user may provide a force to the pin 430 that sufficiently opposes the biasing force of the spring 438 to transition the pin 430 from the third axial position 806 to the first or second axial positions 802, 804. While the user holds the pin 430 in the first axial position 802, the hitch assembly 206 may be moved out of the neutral angle and to a distance other than the first distance 616. After the hitch assembly 206 is move away from the first distance 616, the user may release the pin 430 and allow the biasing force of the spring 438 press the pin 430 axially into a top surface of the draw bar 502.

The pin 430 may have an end 808 that is chamfered, rounded, or otherwise smooth and that contacts the top surface of the draw bar 502 when the pin 430 is in the first axial position 802 and the spring 438 is providing the axially biasing force. The end 808 may be smooth enough and the biasing force of the spring 438 may be small enough to allow the draw bar 502 to slide axially along the longitudinal axis 210 between the first distance 616 and the second distance 622. However, once the hitch assembly 206 becomes disposed at the first distance 616, the pin 430 may become axially aligned with the second through-hole 514 and the biasing force of the spring 438 may force the pin 430 at least partially into the second through-hole 514, thereby substantially locking the hitch assembly 206 at the first distance 622 from the carrier assembly 202.

Once the pin 430 becomes disposed in the second through-hole 514, however, the end 808 of the pin 430 may contact a top surface of the second plate 304 if the hitch module 200 is not in the neutral angle. That is to say, the pin 430 will not be aligned with the third through-hole 702 if the longitudinal axis 210 is not aligned with the carrier axis 614. Further, when the pin 430 is not aligned with the third through-hole 702, the biasing force of the spring 438 and the end 808 of the pin 430 may be configured to slide along the top surface of the second plate 304 as the hitch assembly 206 moves between either the positive offset angle 618 or the negative offset angle 620 into alignment with the longitudinal axis 210 and the carrier axis 614 in the neutral angle. If the hitch module 200 becomes positioned in the neutral angle, the biasing force of the spring 438 may be sufficient to transition the pin 430 at least partially into the third and fourth through-holes 702, 428. In other words the pin 430 may transition from the second axial position 804 to the third axial position 806 thereby locking the hitch module 200 in the neutral angle and the first distance 616 relative to the carrier assembly 202.

In one nonexclusive example, the hitch module 200 may be coupled to the frame 106 of the towed assembly 100. The user may manipulate the towed assembly 100 to align the hitch module 200 with a hitch coupler of a work machine or with another towed assembly. The user may then position the pin 430 of the hitch module 200 in the first axial position 802 and manipulate the hitch link 504 to become aligned with the hitch coupler. As the user manipulates the hitch link 504, the hitch module 200 may become disposed in any configuration between the positive offset angle 618 and the negative offset angle 620 and the first distance 616 and the second distance 622. The user may then couple the hitch link 504 to the hitch coupler. Once the hitch link 504 is coupled to the hitch coupler, the user may back the work machine towards the towed assembly 100. As the work machine is backed toward the towed assembly 100, the hitch coupler may force the hitch assembly 206 along the longitudinal axis 210 to the first distance 616 from the carrier assembly 202. Once the hitch assembly 206 is at the first distance 616, the biasing force of the spring 438 may transition the pin 430 to the second axial position 804, thereby locking the hitch assembly 206 at the first distance 616.

The user may then direct the work machine away from the towed assembly 100 along a linear path. As the towed assembly 100 becomes aligned along the linear path of the work machine, the longitudinal axis 210 of the hitch assembly 206 may become aligned with the carrier axis 614 where the hitch module 200 is in the neutral angle. Once the hitch assembly 206 is in the neutral angle, the biasing force of the spring 438 may position the pin 430 in the third axial position 806 thereby locking the hitch module 200 in the neutral angle and in the second position 604.

In one embodiment, the axial position of the pin 430 may control the potential movement of the hitch module 200 as described above. For example, when the pin 430 is in the first axial position 802, the hitch assembly 206 may move between the first distance 616 and the second distance 622 and also move between the positive offset angle 618 and the negative offset angle 620. However, when the pin 430 is in the second axial position 804 the hitch assembly 206 may be locked the first distance 616 but still positionable at any location between the positive offset angle 618 and the negative offset angle 620. Finally, in the third axial position 806, the pin 430 may substantially restrict movement of the hitch assembly 206 both in the negative and/or positive offset angle 618, 620 and between the first and second distance 616, 622. In one non-limiting aspect of this embodiment, one locking mechanism (i.e., the pin 430) may substantially lock both the distance and the angle of the hitch assembly 206 relative to the carrier assembly 202.

Figure 9:
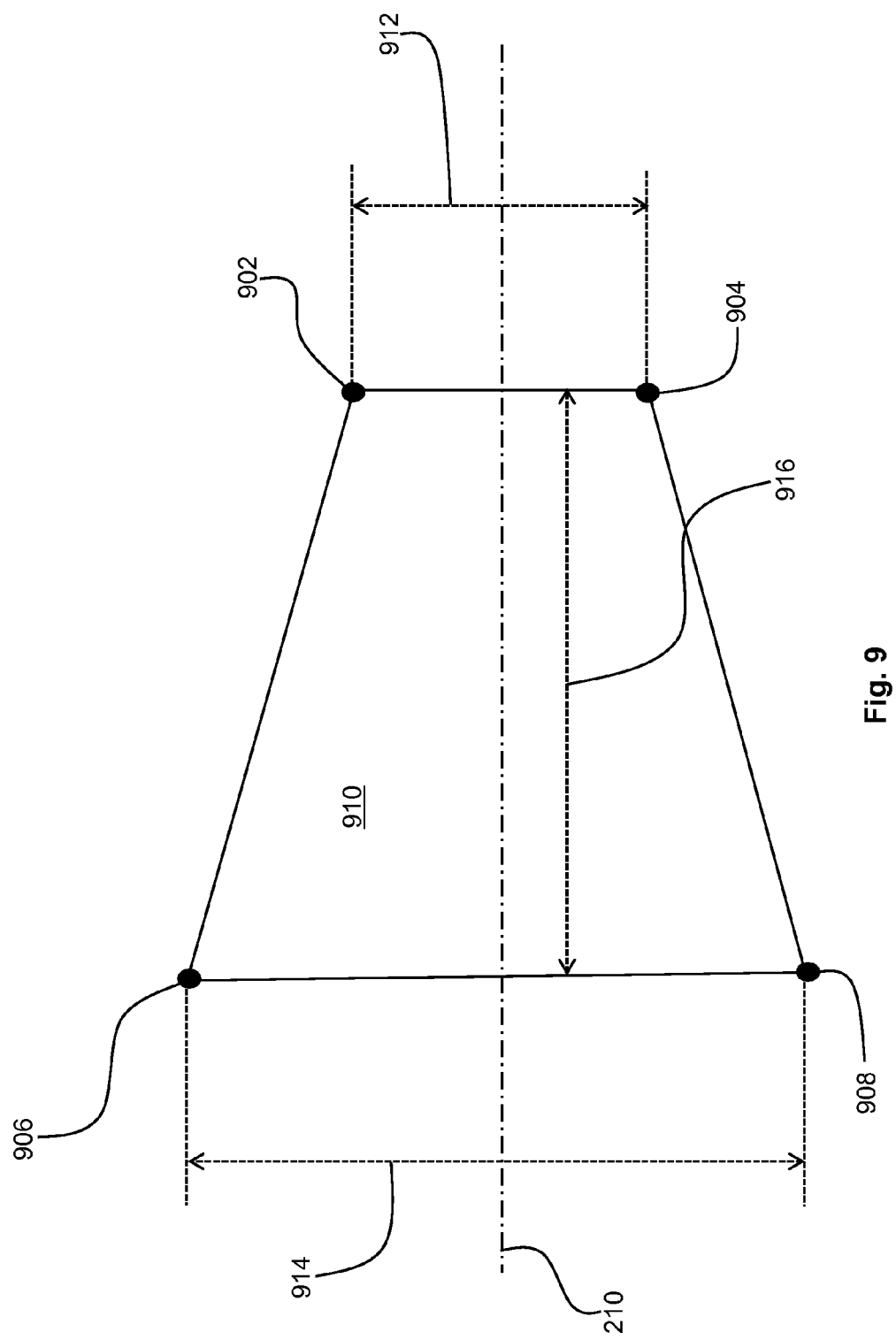
FIG. 9 is a diagrammatical representation of a range of motion for a hitch link of the hitch module of FIG. 2.

In one embodiment, the hitch link 504 may be positionable at any location relative to the carrier assembly 202 between the positive offset angle 618, the negative offset angle 620, the first distance 616 and the second distance 622. The range of the hitch link 504 is shown more clearly in FIG. 9. More specifically a first point 902 may be the location of the hitch link 504 when the hitch assembly 206 is in the positive offset angle 618 and at the first distance 616. A second point 904 may be the location of the hitch link 504 when the hitch assembly 206 is in the negative offset angle 620 and at the first distance 616. A third point 906 may be the location of the hitch link 504 when the hitch assembly 206 is at the positive offset angle 618 and the second distance 622. Finally, a fourth point 908 may be the location of the hitch link 504 when the hitch assembly 206 is at the negative offset angle 620 and the second distance 622.

An internal area 910 may be defined between the points 902, 904, 906, 908. The hitch link 504 may be positionable at any location within the internal area 910 when the pin 430 is in the first axial position 802. Further, in one non-limiting example, a first difference 912 between the first point 902 and the second point 904 may be about 13.5 inches. A second difference 914 between the third point 906 and the fourth point 908 may be, for example, about 22 inches. Finally, a third difference 916 along the longitudinal axis 210 may be about 11 inches. These dimensions are only provided as an example and are not intended to limit the scope of this disclosure. Moreover, the internal area 910 of FIG. 9 may form a substantially trapezoidal shape to accommodate the plurality of positions at which the hitch assembly may be disposed for coupling the hitch module to a frame of a work vehicle or towed assembly.

Another embodiment may involve a method of assembling the hitch module 200. The method may include providing the carrier assembly 202, the guide assembly 204, and the hitch assembly 206 and placing the second guide plate 404 on a work surface (not shown) to define the longitudinal axis 210. The wear plates 412 can then be aligned at the first end 414 and the second end 416 of the second guide plate 404. The second plate 304 may be positioned on top of the second guide plate 404 with the longitudinal axis 210 disposed along a middle section of the second plate 304. The second plate 304 may be positioned between the wear plate 412 at the first end 414 and the wear plate 412 at the second end 416.

The draw bar 502 may then be aligned with the longitudinal axis 210 and placed on the second plate 304 at a location where the base end 520 extends from the rear portion 214 of the second plate 304 and the receiving end 522 extends from the front portion 212 of the second plate 304. The first plate 302 may then be aligned with the longitudinal axis 210 along a middle section of the first plate 302. The front and rear portion 212, 214 of the first plate 302 may be aligned with the front and rear portion 212, 214 of the second plate 304. Further, additional wear plates 412 may be aligned with the longitudinal axis 210. One wear plate 412 may be positioned proximate to the rear portion 214 of the first plate 302 and one wear plate 412 may be positioned proximate to the front portion 212 of the first plate 302. The first guide plate 402 may be aligned with the longitudinal axis 210 and the first guide plate 402 may then be positioned on top of the first plate 302 and each wear plate 412.

Next, the spacers 408 may be positioned between the wear plates 412 and the first and second guide plate 402, 404. The couplers 410 may then be positioned through the first guide plate 402, the wear plates 412 and the spacers 408, and through the second guide plate 404. The coupler plate 308 may be coupled to the first plate 302 and/or the second plate 304. The pin 430 can then be at least partially positioned through the frame through-hole 422. Further, the spring 438 may be positioned to at least partially encompass the portion of the pin 430 positioned between the U-shaped frame member 420 and the first guide plate 402. The first stop 432 can then be coupled to the pin 430 at an outer portion of the U-shaped frame member 420 and the second stop 436 can be coupled to the pin 430 at a location proximate to the spring 438. More particularly, the second stop 436 can be positioned at a location along the pin 430 that positions the pin 430 between the second stop 436 and the U-shaped frame member 420.

While a method of assembling the hitch module 200 has been described in detail above in a sequential manner, the particular orientation of each assembly step is not limited. A person having skill in the art understands that the steps of assembly can be sequenced in a plurality of different orders without straying from these teachings. Accordingly, this disclosure is not limited to any particular sequence of assembly.

Figure 10:
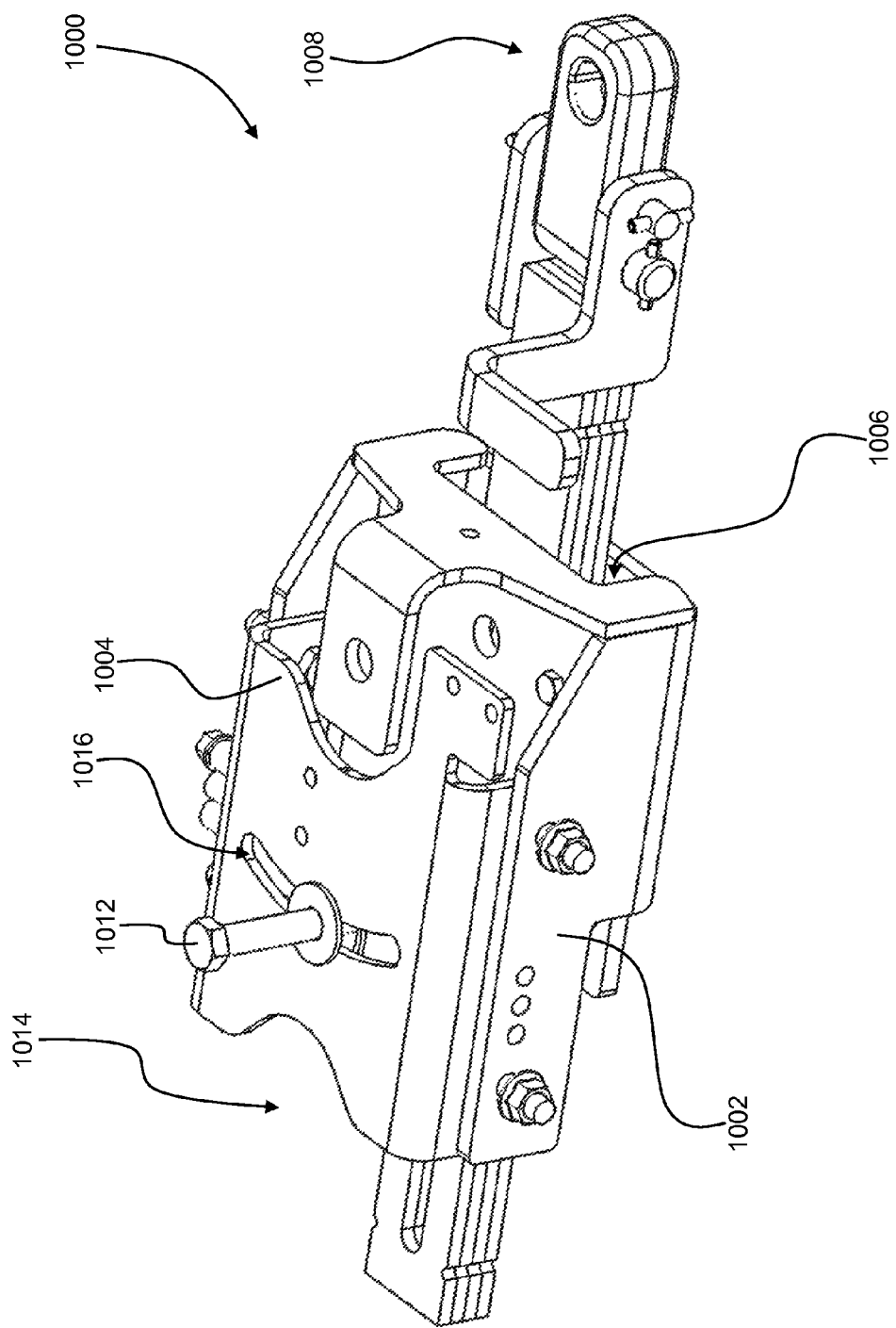
FIG. 10 is an isolated perspective view of a second embodiment of a hitch module.

Referring now to FIG. 10, a different embodiment of a hitch module 1000 is shown. The hitch module 1000 may have a frame 1002 and a subframe 1004 coupled to one another. Further, the hitch module 1000 may define a cavity 1006 in which a hitch assembly 1008 can be positioned. Further, the hitch module 1000 may have a first engagement pin (not shown) and a second engagement pin 1012 positionable through the frame 1002, subframe 1004, and/or the hitch assembly 1008.

In one embodiment, the hitch assembly 1008 may have a longitudinal slot 1014 disposed therein. Further, the subframe 1004 may have a first arc-shaped slot 1016 disposed therein. In this embodiment, the second engagement pin 1012 may be disposed through both the first arc-shaped slot 1016 and the longitudinal slot 1014. The cross-sectional view shown in FIG. 11 more clearly illustrates the relationship of the second engagement pin 1012 and the hitch module 1000. More specifically, a second and third arc-shaped slot 1018, 1020 are shown defined by the frame 1002.

Figure 11:
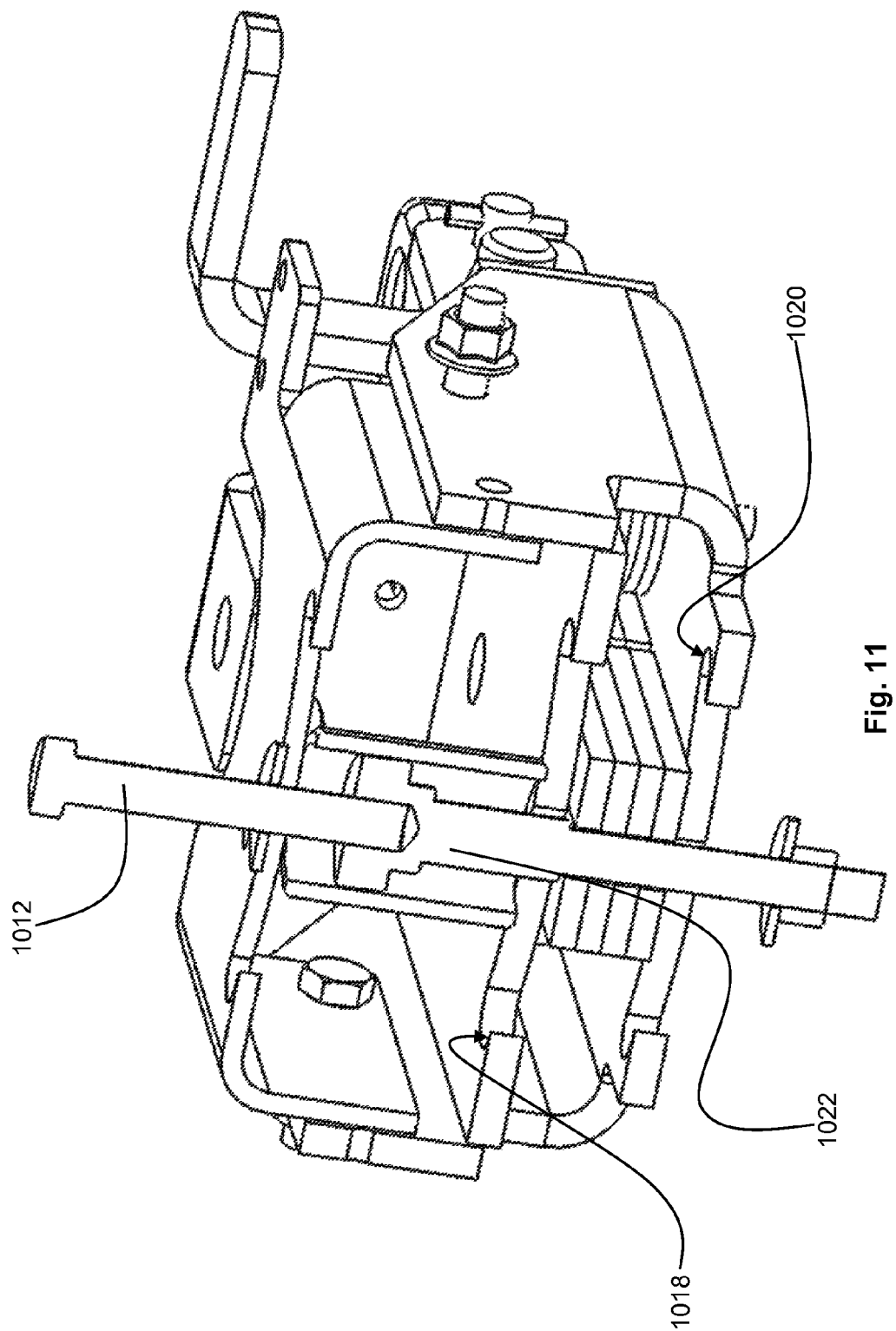
FIG. 11 is a cross-sectional perspective view of the hitch module of FIG. 10.

Also shown in FIG. 11 is a tapered body 1022 coupled to the second engagement pin 1012. The tapered body 1022 may have a small diameter and a large diameter (not specifically referenced). The small diameter may be sized to travel within the second arc-shaped slot 1018. The large diameter portion of the tapered body 1022 may travel along a top surface of the frame 1002 when the second engagement pin 1012 is not disposed in a central portion of the second arc-shaped slot 1018. However, when the tapered body 1022 becomes aligned with the central portion of the second arc-shaped slot 1018, the tapered body 1022 may fall into a central bore (not shown) defined in the second arc-shaped slot 1018. Once the large diameter portion of the tapered body 1022 is disposed within the central bore, the second engagement pin 1012 may then be substantially locked in the central portion of the second arc-shaped slot 1018.

When the hitch assembly 1008 is locked in the central portion of the second arc-shaped slot 1018 as described above, the hitch assembly 1008 may still move axially along the longitudinal slot 1014. More specifically, the longitudinal slot 1014 may be defined along the length of the hitch assembly 1008 and be sized to allow the second engagement pin 1012 to pass therethrough. Accordingly, even when the second engagement pin 1012 is locked in the central position, the hitch assembly 1008 can move axially along the longitudinal slot 1014. In addition to the engagement between the longitudinal slot 1014 and the second engagement pin 1012, the hitch assembly 1008 may be held in axial alignment by rollers (not shown). The rollers can be located along a front end of the hitch module 1000 to maintain the position of the hitch assembly 1008. In one embodiment, when the second engagement pin 1012 is not disposed in the central portion the hitch assembly 1008 may pivot between the rollers to become disposed in several angular orientations relative to the frame 1002.

The first engagement pin may be positioned substantially between the rollers. Further, the first engagement pin may correspond with through-holes (not shown) defined in the hitch assembly 1008. In one embodiment, the first engagement may be selectably positionable in one of a plurality of through holes in the hitch assembly 1008 to allow the hitch assembly 1008 to extend away from the frame 1002 to a plurality of distances.

The embodiments shown and described for FIGS. 10 and 11 may allow the hitch assembly 1008 to be adjusted both radially and axially relative to the frame 1002. Further, this embodiment may allow the hitch assembly 1008 to be substantially locked both radially and axially relative to the frame 1002.

Figure 12:
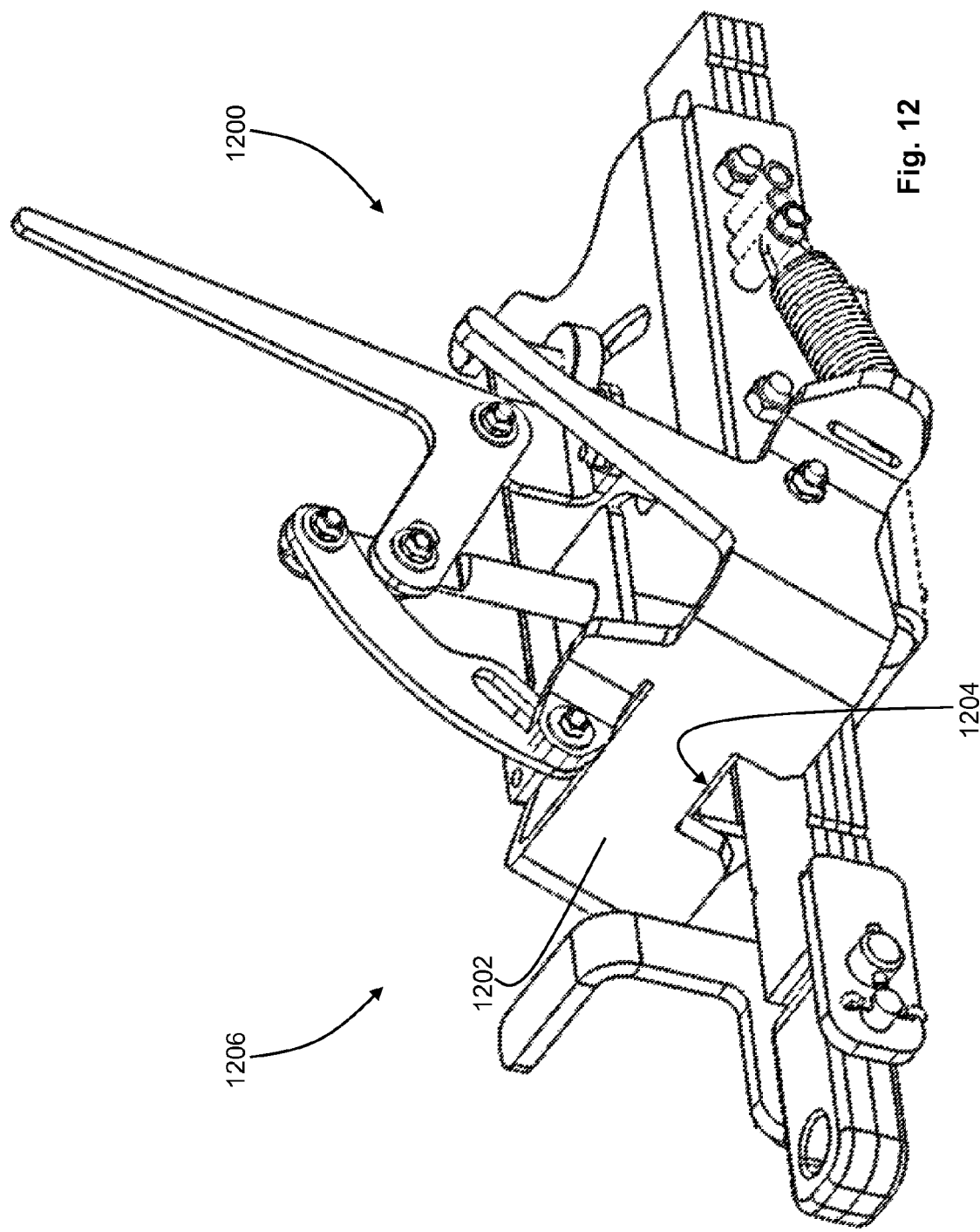
FIG. 12 is an isolated perspective view of a third embodiment of the a hitch module in an open position.
Figure 13:
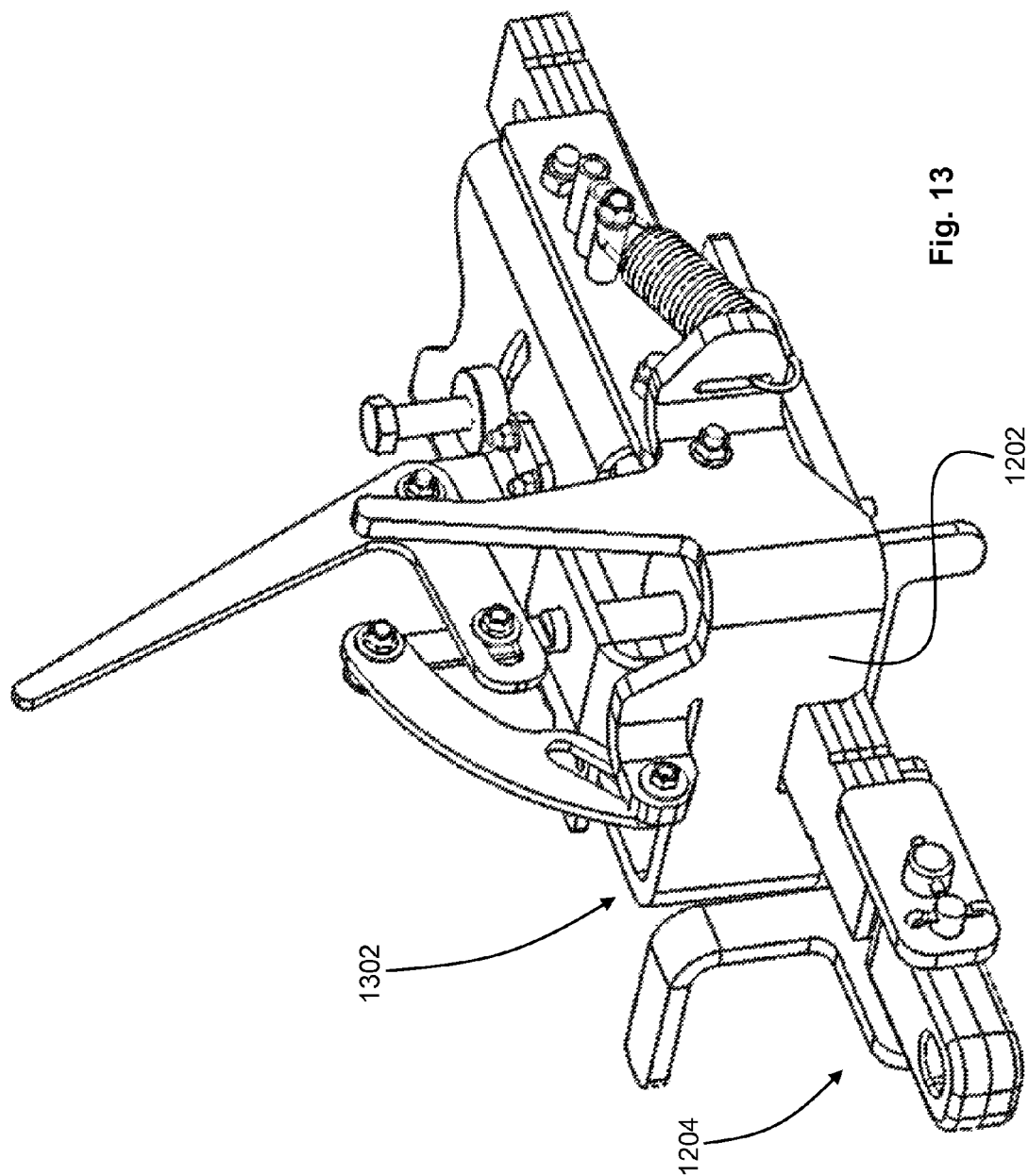
FIG. 13 is an isolated perspective view of the hitch module of FIG. 12 in a closed position.

FIGS. 12 and 13 illustrate a hitch module 1200 that utilizes many of the features of the hitch module 1000 of FIGS. 10 and 11 but also includes a lock plate 1202 to maintain the hitch assembly 1008 in longitudinal alignment. More specifically, the lock plate 1202 may have a cut-out 1204 defined therein. The cut-out 1204 may substantially correspond with the dimensions of the hitch assembly 1008. The lock plate 1202 may be pivotally coupled to the frame 1002 to be positionable between an open position 1206 and a closed position 1302. In the open position 1206, the lock plate 1202 may not substantially restrict the hitch assembly 1008 from rotating relative to the frame 1002. However, in the closed position 1302 the lock plate 1202 may be positioned so the hitch assembly 1008 is located at least partially within the cut-out 1204 and is thereby substantially restricted from moving radially relative to the frame 1002.

Figure 14:
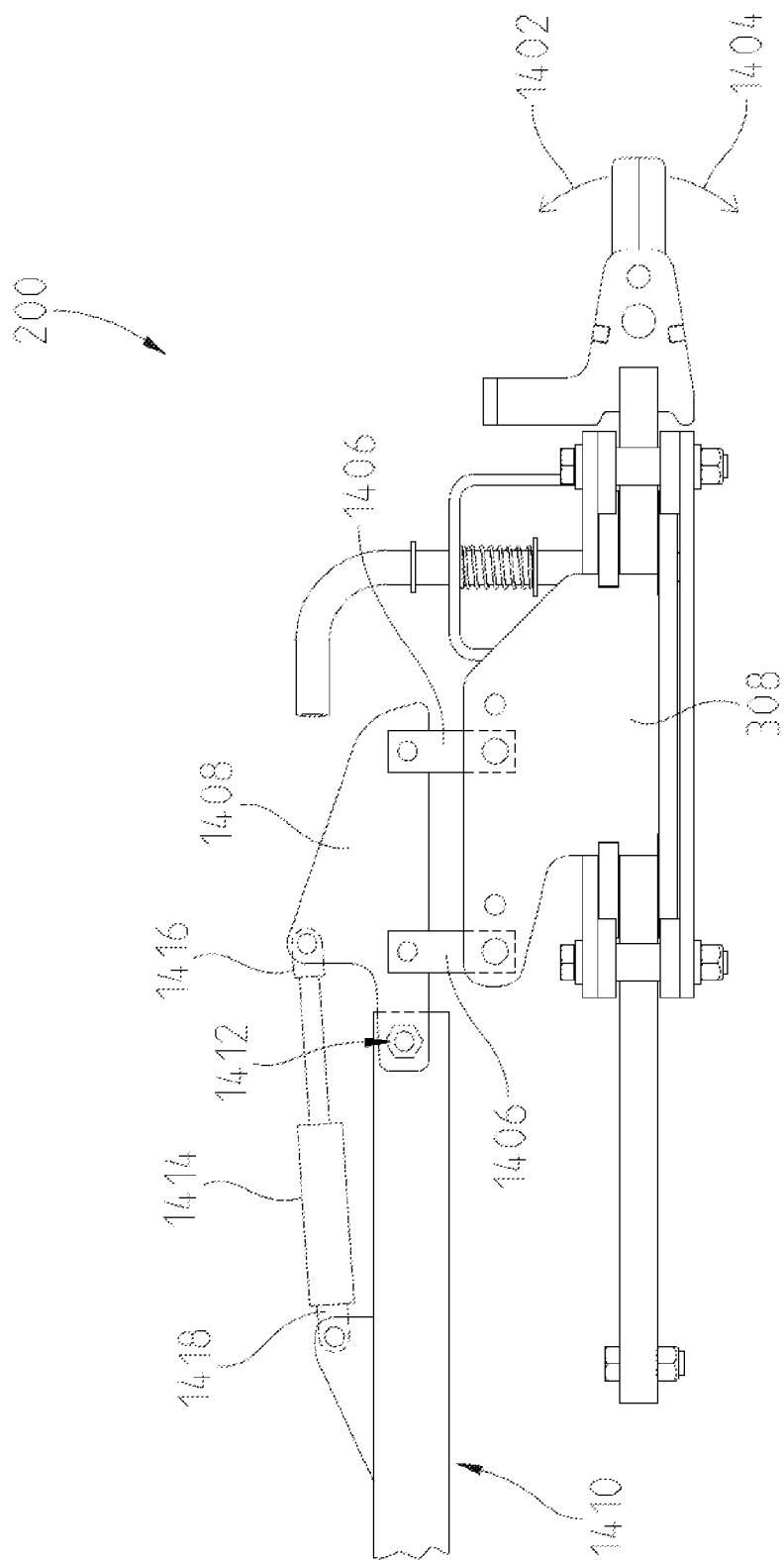
FIG. 14 is a side view of one embodiment of a hitch module that can move in an up and a down direction.

FIG. 14 shows yet another embodiment where the hitch module 200 may also pivot in an up direction 1402 and a down direction 1404. In this embodiment, one or more bar linkage 1406 may couple the coupler plate 308 to a pivot plate 1408. The pivot plate 1408 may be pivotally coupled to a hitch member 1410 at a hitch pivot 1412. The pivot plate 1408 may pivot about the hitch pivot 1412 to move the hitch module 200 in the up direction 1402 and the down direction 1404. In one aspect of this embodiment, the pivot plate 1408 may also be pivotally coupled to a cylinder 1414 at a shaft end 1416. The cylinder 1414 may further be pivotally coupled to the hitch member 1410 at a base end 1418.

The cylinder 1414 may have a variable stroke and the distance between the base end 1418 and the shaft end 1416, or the cylinder length, may change. As the cylinder 1414 length changes, the pivot plate 1408 and the hitch module 200 may move in the up direction 1402 or the down direction 1404 correspondingly. The cylinder 1414 may be a hydraulic cylinder, an electric actuator, a pneumatic cylinder, a bolt and nut configuration, or any other similar apparatus that can vary length.

Figure 15:
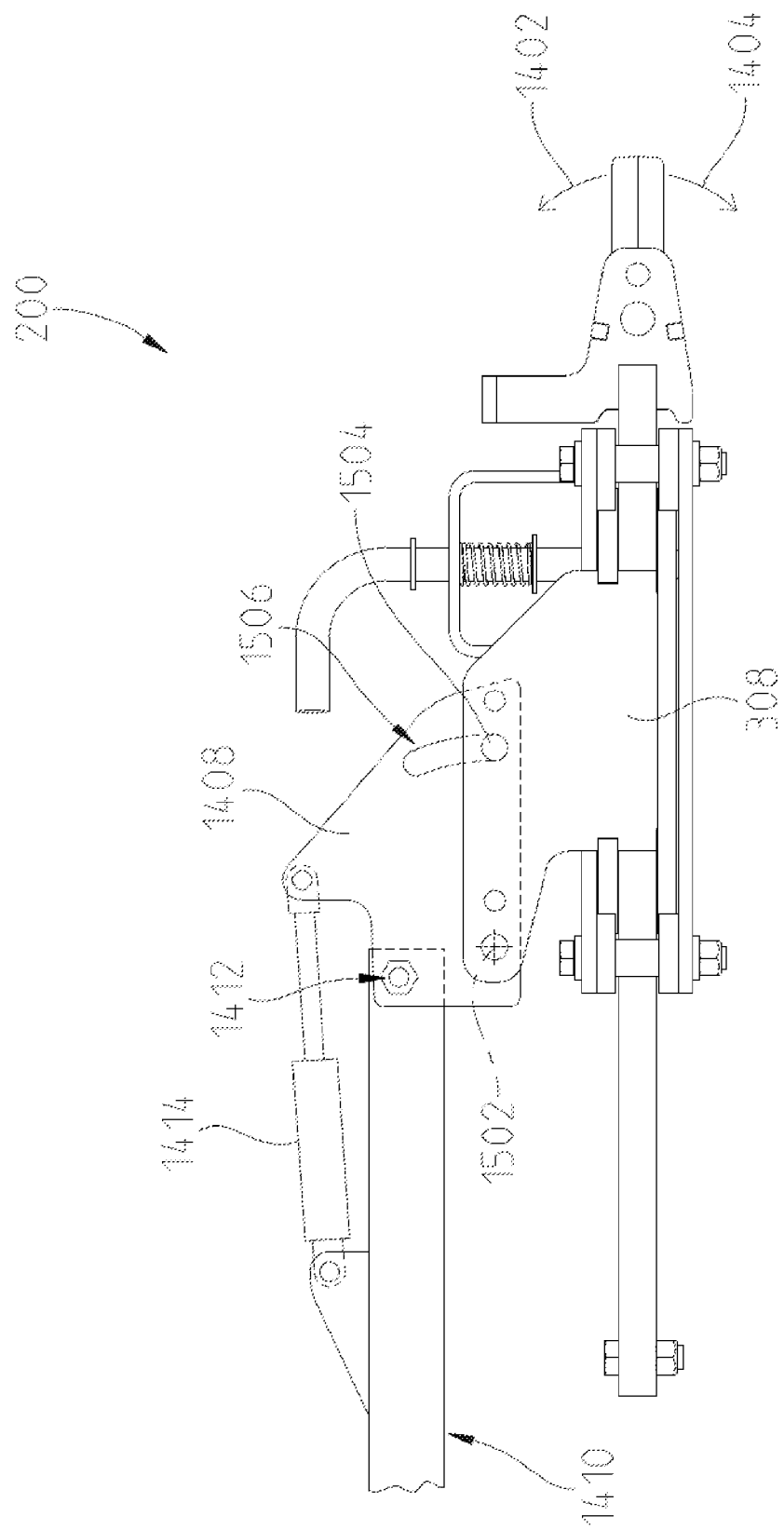
FIG. 15 is a side view of another embodiment of a hitch module that can move in an up and a down direction.

The embodiment shown in FIG. 15 may be substantially the same as described above for FIG. 14 with a few exceptions. For instance, instead of coupling the pivot plate 1408 to the coupler plate 308 with the bar linkage 1406, the embodiment of FIG. 15 may be pivotally coupled to the pivot plate 1408 to the coupler plate 308 at a coupler plate axis 1502. The coupler plate 308 may also have a coupler pin 1504 positioned through an arc-shaped pivot through-hole 1506. The arc-shaped pivot through-hole 1506 may be a through-hole defined along an arc centred at the coupler plate axis 1502.

In this embodiment, the hitch module 200 may pivot relative to the pivot plate 1408. More specifically, the coupler plate 308 may pivot about the coupler plate axis 1502 relative to the pivot plate 1408 as long as the coupler pin 1504 remains within the arc-shaped pivot through-hole 1506. Accordingly, the embodiment of the hitch module 200 shown in FIG. 15 may pivot about the hitch pivot 1412 via the cylinder 1414 and may also pivot about the coupler plate axis 1502 as long as the coupler pin 1504 remains within the arc-shaped pivot through-hole 1506.

Referring now to FIGS. 16a and 16b, another embodiment of the hitch module 200 is shown where a pin contact 1602 may be positioned along the hitch assembly 206. In the embodiment shown in FIG. 16, the pin 430 may have a radial extrusion 1608 that extends radially from the central axis 322. The radial extrusion 1608 may be positioned axially along the pin 430 at a location that is just above the frame member 420 when the pin 430 is in the first axial position 802 as shown in FIG. 16a. Further, the frame through-hole 422 may have a notched portion 1610 that corresponds in size with the radial extrusion 1608 of the pin 430. In this embodiment, the pin 430 may only be transitioned into, or out of, the first axial position 802 when the radial extrusion 1608 of the pin 430 is aligned with the notched portion 1610 of the frame through-hole 422.

In one embodiment, the pin 430 may also have a pin arm 1612 defined at a distal portion of the pin 430 relative to the hitch assembly 206. The pin arm 1612 may define a pin arm axis 1606 that extends perpendicularly from the central axis 322. In the embodiment shown in FIG. 16a, the pin 430 may be maintained in the first axial position 802 by aligning the radial extrusion 1608 with the notched portion 1610, sliding the pin 430 to the first axial position 802, and rotating the pin 430 so the radial extrusion 1608 is no longer aligned with the notched portion 1610. In this configuration, the radial extrusion 1608 of the pin 430 may contact a portion of the frame through-hole 422 and resist the axially biasing force of the spring 438. Further, from this position, the pin 422 may not be axially moved to either the second axial position 804 or the third axial position 806 until the pin 430 is rotated to align the radial extrusion 1608 of the pin 430 with the notched portion 1610 of the frame through-hole 422.

In one embodiment, the pin contact 1602 may be coupled to the hitch assembly 206. The pin contact 1602 may be an arc-shaped member extending from the hitch link coupler 506 to a pin bumper 1604 at a distal end. The pin bumper 1604 may be spaced to align with the pin arm 1612 when the pin 430 is in the first axial position 802. The pin bumper 1604 may further be positioned to contact the pin arm 1612 when the pin arm axis 1606 is not parallel with the longitudinal axis 210. Further, the pin bumper 1604 may also be positioned to rotate the pin arm axis 1606 into parallel alignment with the longitudinal axis 210 when the hitch assembly 206 is the first distance 616 from the carrier assembly 202.

In one nonexclusive embodiment, the pin 430 may be in the third axial position 806. The user may align the radial extrusion 1608 with the notched portion 1610 and pull the pin 430 axially to the first axial position 802. The user may then rotate the pin 430 so the pin arm axis 1606 is no longer parallel with the longitudinal axis 210. The user may then release the pin 430 and allow the radial extrusion 1608 to substantially rest on portions of the frame through-hole 422 to maintain the pin 430 in the first axial position 802. The user may then manipulate the hitch link 504 to couple to a hitched assembly while the pin 430 is retained in the first axial position 802. The user may then engage a work machine to transition the hitch assembly 206 to the first distance 616. As the hitch assembly 206 is transitioned to the first distance 616, the pin bumper 1604 of the pin contact 1602 may contact the pin arm 1612 and begin to rotate the pin arm axis 1606 into parallel alignment with the longitudinal axis 210, thereby aligning the radial extrusion 1608 with the notched portion 1610. Once the hitch assembly 206 is positioned at the first distance 616, the pin bumper 1604 may have rotated the pin arm axis 1606 sufficiently to align the radial extrusion 1608 with the notched portion 1610, thereby allowing the pin 430 to become axially positioned in either the second axial position 804 or the third axial position 806.

While certain axes have been defined and there particular orientation to one another has been described in detail, this disclosure is not limited to any particular axial alignments. More specifically, any number of axes and alignments could be used to align a radial extrusion with a notched portion of a through-hole and the particular orientations described is not limiting. Further, while the pin contact 1602 has been described as arc-shaped, the particular shape of the pin contact 1602 is not limiting. A person skilled in the art understands the many shapes in which the pin contact could be formed to achieve substantially the same result. Further still, multiple radial extrusions and corresponding notched sections could be used instead of just one.

In yet another embodiment of this disclosure, the pin 430 may have a position sensor (not particularly shown) positioned thereon. More specifically, the second stop 436 may have a tab or other feature that provides an axial position indication of the pin 430. The position sensor may be disposed along a top portion of the first guide plate 402 at a location that allows the position sensor to determine the position of the tab or other feature. In this non-limiting example, as the pin 430 moves axial positions, the tab of the second stop 436 moves axially with the pin 430 thereby providing a basis for the position sensor to determine the overall axial position of the pin 430. This disclosure is not limited to such a configuration for the position sensor and many other types of sensors and locations are also considered herein.

The position sensor may provide a signal to the user of the specific axial orientation of the pin 430. The signal may be an audible sound from a speaker or a visual indication such as illuminating a light on an instrument panel. More specifically, the position sensor may identify when the pin 430 is in the first axial position 802 or the third axial position 806 and send a corresponding signal to the user as described above. In another embodiment, the position sensor may also provide a signal to the user when the pin 430 is in the second axial position 804. The position sensor may be a proximity sensor with an integrated circuit package having a laser beam transmitter, receiver, and detector circuits. Alternatively, inductive proximity sensors may be used along with any other similar sensor known in the art to detect a distance between two objects. Many different types of sensors and locations of the sensors are considered herein and this disclosure is not limited to any particular type of sensor or signal.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hitch module, comprising:
a carrier assembly including a first plate and a second plate coupled to one another, the first and second plates spaced from one another by a first distance, where both plates define a pivot axis;
a guide assembly defining a longitudinal axis and being pivotally coupled to the carrier assembly about the pivot axis, the guide assembly having a first guide plate and a second guide plate coupled to one another and spaced by a second distance from one another, where the second distance is greater than the first distance; and
a hitch assembly disposed at least partially between the first and second plate of the carrier assembly and the first and the second guide plate, the hitch assembly being pivotal about the pivot axis relative to the carrier assembly and movable along the longitudinal axis relative to the guide assembly;
wherein, the first plate and the second plate of the carrier assembly are positioned at least partially between the first guide plate and the second guide plate.

2. The hitch module of claim 1, wherein the hitch assembly comprises a hitch link that is movable to a plurality of positions relative to the guide assembly and carrier assembly, the plurality of positions defined within a trapezoidal-shaped area having at least four points, wherein a first point is at a first position and a first angle, a second point is at the first position and a second angle, a third point is at a second position and the first angle, and a fourth point is at the second position and the second angle.

3. The hitch module of claim 1, wherein:
the hitch assembly is extendable along the longitudinal axis relative to the guide assembly between a first position and a second position; and
the guide assembly is pivotable about the pivot axis in a first direction by a first angle relative to the longitudinal axis and a second direction by a second angle relative thereto.

4. The hitch module of claim 1, further comprising:
a first through-hole axially aligned through the first guide plate, the first through-hole being spaced a first radial distance from the pivot axis;
an opening defined in the first plate, the opening defined at the first radial distance from the pivot axis;
a second through-hole defined in the hitch assembly;
a third through-hole defined in the second plate and defined at the first radial distance from the pivot axis; and
a fourth through-hole defined in the second guide plate and axially aligned with the first through-hole, the fourth through-hole defined at the first radial distance from the pivot axis;
wherein, the first through-hole, the opening, and the second through-hole are aligned with one another when the hitch assembly is in a first position, and the first through-hole is misaligned from the second through-hole when the hitch assembly is in a second position.

5. The hitch module of claim 4, further comprising a pin axially aligned with the first through-hole and configured to move axially along a central axis defined by the first through-hole, the pin being selectively positioned in at least one of three axial positions, wherein:
in a first axial position, the hitch assembly is not in the first position and the pin is disposed through a portion of the first through-hole and the opening;
in a second axial position, the hitch assembly is in the first position, the guide assembly is not axially aligned with the longitudinal axis, and the pin is disposed through the first through-hole, the opening, and the second through-hole; and
in a third axial position, the hitch assembly is in the first position, the guide assembly is aligned with the longitudinal axis, and the pin is disposed through the first through hole, the opening, the second through-hole, the third through-hole and the fourth through-hole.

6. The hitch module of claim 5, further comprising a sensor coupled to the first guide plate, the sensor adapted to detect when the pin is disposed in the third axial position.

7. The hitch module of claim 1, further comprising:
a U-shaped frame member coupled to the first guide plate, the U-shaped frame defining a pin through-hole; and
a spring disposed between the U-shaped frame member and the first guide plate, the spring biasing the pin towards the second guide plate;
wherein, the pin is disposed through the pin through-hole in at least one of three axial positions.

8. The hitch module of claim 7, wherein the pin comprises at least a first stop and a second stop, the first stop limiting axial movement of the pin as it contacts the U-shaped frame member, and the second stop limiting axial movement of the pin as it contacts the first guide plate.

9. The hitch module of claim 8, further comprising a sensor coupled to the first guide plate, the sensor adapted to monitor the second stop and detect the axial position of the pin based on a location of the second stop.

10. The hitch module of claim 7, wherein, when the pin is in a second of the three axial positions, the hitch assembly is substantially restricted from moving out of a first position, and the hitch assembly and the guide assembly can pivot relative to the carrier member.

11. The hitch module of claim 7, wherein when the pin is in a third of the three axial positions, the hitch assembly being restricted from moving out of a first position, and the hitch assembly and the guide assembly are restricted from rotating relative to the carrier member.

12. The hitch module of claim 1, wherein the guide assembly further comprises:
at least one spacer coupling the first guide plate to the second guide plate; and
at least one wear plate disposed between the first guide plate and the second guide plate, the at least one wear plate having a radially-defined edge that is disposed in contact with the first guide plate or second guide plate.

13. The hitch module of claim 1, further comprising:
a work machine;
an implement including a frame, the implement being coupled to the work machine;
the hitch module being mounted to either the work machine or the implement; and
a chemical applicator coupled to the hitch module of the work machine or the implement.

14. A hitch module for coupling to a frame of a work machine or work implement, comprising:
a carrier assembly including a first plate, a second plate, and at least one coupler plate coupling the first and second plates to one another, the first and second plates being disposed parallel to and spaced from one another by a first distance, where a pivot axis is defined through both the first and second plates;
a guide assembly defining a longitudinal axis and being pivotally coupled to the carrier assembly about the pivot axis, the guide assembly including a first guide plate and a second guide plate coupled to one another and spaced by a second distance from one another, where the second distance is greater than the first distance; and
a hitch assembly disposed at least partially between the first and second plates of the carrier assembly and the first and the second guide plates of the guide assembly, the hitch assembly including a draw bar and a hitch link;
wherein, the hitch assembly is pivotal about the pivot axis relative to the carrier assembly and movable along the longitudinal axis relative to the guide assembly;
further wherein, the first plate and the second plate of the carrier assembly are positioned at least partially between the first guide plate and the second guide plate.

15. The hitch module of claim 14, wherein:
the hitch link is longitudinally movable between a first position and a second position relative to the guide assembly; and
the hitch link is pivotable about the pivot axis between a first angle and a second angle.

16. The hitch module of claim 15, wherein the hitch link is selectively moved to any one of a plurality of positions relative to the guide assembly and carrier assembly, the plurality of positions defined within a trapezoidal-shaped area formed by at least four points, wherein a first point is at a first position and a first angle, a second point is at the first position and a second angle, a third point is at a second position and the first angle, and a fourth point is at the second position and the second angle.

17. The hitch module of claim 14, further comprising a pin axially aligned with an opening defined in the first guide plate and configured to move axially along a central axis defined therethrough, the pin being selectively positioned in at least one of three axial positions, wherein:

in a first axial position, the hitch assembly is not in the first position and the pin is disposed through a portion of the opening and a second opening defined in the first plate;
in a second axial position; the hitch assembly is in the first position, the guide assembly is not axially aligned with the longitudinal axis, and the pin is disposed in the opening, the second opening, and a third opening defined in the hitch assembly; and
in a third axial position, the hitch assembly is in the first position, the guide assembly is aligned with the longitudinal axis, and the pin is disposed through the opening, the second opening, the third opening, a fourth opening defined in the second plate, and a fifth opening defined in the second guide plate.

18. A hitch module for coupling to a frame of a work machine or work implement, comprising:
a carrier assembly including a first plate, a second plate, and at least one coupler plate coupling the first and second plates to one another, the first and second plates defining a pivot axis and being disposed parallel to and spaced from one another by a first distance; where the first plate defines an arc-shaped through-hole that defines a central axis therethrough, the central axis being disposed a first radial distance from the pivot axis;
a guide assembly being pivotally coupled to the carrier assembly about the pivot axis, the guide assembly including a first guide plate; a second guide plate coupled to and spaced by a second distance from the first guide plate, at least two spacers, at least two wear plates disposed between the first and second guide plates, a U-shaped frame member coupled to the first guide plate, a pin axially movable relative to the first and second guide plates, and a spring disposed between the U-shaped frame member and the first guide plate, wherein the second distance is greater than the first distance; and
a hitch assembly disposed at least partially between the first and second plates of the carrier assembly and the first and the second guide plates of the guide assembly, the hitch assembly including an elongated draw bar, a hitch link coupler, and a hitch link adapted to be coupled to the frame, the hitch link coupler coupling the draw bar and hitch link to one another;
wherein, the hitch assembly and guide assembly are pivotal about the pivot axis relative to the carrier assembly;
further wherein, the hitch assembly is slidably movable along a longitudinal axis relative to the carrier assembly and guide assembly.

19. The hitch module of claim 18, further comprising:
a pin axially aligned with opening defined in the first guide plate and configured to move axially along a central axis passing through the opening, the pin being selectively positioned in at least one of three axial positions; and
a sensor coupled to the first guide plate, the sensor adapted to detect when the pin is disposed in at least one of the three axial positions.

20. The hitch module of claim 18, further comprising:
a work machine;
an implement including a frame, the implement being coupled to the work machine;
the hitch module being mounted to either the work machine or the implement; and a chemical applicator coupled to the hitch module of the work machine or the implement.

21. A hitch module, comprising:
a carrier assembly including a first plate and a second plate coupled to one another, the first and second plates spaced from one another by a first distance, where both plates define a pivot axis;
a guide assembly defining a longitudinal axis and being pivotally coupled to the carrier assembly about the pivot axis, the guide assembly having a first guide plate and a second guide plate coupled to one another and spaced by a second distance from one another, where the second distance is greater than the first distance; and
a hitch assembly disposed at least partially between the first and second plate of the carrier assembly and the first and the second guide plate, the hitch assembly being pivotal about the pivot axis relative to the carrier assembly and movable along the longitudinal axis relative to the guide assembly
wherein the guide assembly further comprises:
at least one spacer coupling the first guide plate to the second guide plate; and
at least one wear plate disposed between the first guide plate and the second guide plate, the at least one wear plate having a radially-defined edge that is disposed in contact with the first guide plate or second guide plate.

22. The hitch module of claim 21, wherein the hitch assembly comprises a hitch link that is movable to a plurality of positions relative to the guide assembly and carrier assembly, the plurality of positions defined within a trapezoidal-shaped area having at least four points, wherein a first point is at a first position and a first angle, a second point is at the first position and a second angle; a third point is at a second position and the first angle; and a fourth point is at the second position and the second angle.

23. The hitch module of claim 21, wherein the hitch assembly is extendable along the longitudinal axis relative to the guide assembly between a first position and a second position and the guide assembly is pivotable about the pivot axis in a first direction by a first angle relative to the longitudinal axis and a second direction by a second angle relative thereto.

24. The hitch module of claim 21, further comprising:
a U-shaped frame member coupled to the first guide plate, the U-shaped frame defining a pin through-hole; and
a spring disposed between the U-shaped frame member and the first guide plate, the spring biasing the pin towards the second guide plate;
wherein, the pin is disposed through the pin through-hole in at least one of three axial positions.

25. The hitch module of claim 21, further comprising:
a work machine;
an implement including a frame, the implement being coupled to the work machine;
wherein, the hitch module is mounted to either the work machine or the implement; and
a chemical applicator coupled to the hitch module of the work machine or the implement.

* * * * *